US012039994B2

(12) United States Patent
Kitamura et al.

(10) Patent No.: US 12,039,994 B2
(45) Date of Patent: Jul. 16, 2024

(54) AUDIO PROCESSING METHOD, METHOD FOR TRAINING ESTIMATION MODEL, AND AUDIO PROCESSING SYSTEM

(71) Applicant: Yamaha Corporation, Hamamatsu (JP)

(72) Inventors: Daichi Kitamura, Takamatsu (JP); Rui Watanabe, Nomi (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 17/896,671

(22) Filed: Aug. 26, 2022

(65) Prior Publication Data

US 2022/0406325 A1 Dec. 22, 2022

Related U.S. Application Data

(63) Continuation of application No. PCT/JP2021/006263, filed on Feb. 19, 2021.

(30) Foreign Application Priority Data

Feb. 28, 2020 (JP) ................................ 2020-033347

(51) Int. Cl.
*G10L 21/028* (2013.01)
*G10L 25/27* (2013.01)

(52) U.S. Cl.
CPC ............ *G10L 21/028* (2013.01); *G10L 25/27* (2013.01)

(58) Field of Classification Search
CPC ..... G10L 21/028; G10L 25/27; G10L 19/167; G10L 25/51; G06N 3/044; G06N 20/00
See application file for complete search history.

(56) References Cited

U.S. PATENT DOCUMENTS 10,176,826 B2 * 1/2019 Wang ......................... G06F 3/16
10,891,967 B2 * 1/2021 Li ....................... G10L 19/0212
(Continued)

FOREIGN PATENT DOCUMENTS

EP 3392883 A1 * 10/2018 ......... G10L 21/0272
KR 20070073781 A * 7/2007 ........... G10L 19/008

OTHER PUBLICATIONS

Shreya Sose, Swapnil Mali , S.P. Mahajan, "Sound Source Separation Using Neural Network", IEEE, 2019. (Year: 2019).*
(Continued)

*Primary Examiner* — Richemond Dorvil
*Assistant Examiner* — Nadira Sultana
(74) *Attorney, Agent, or Firm* — Crowell & Moring LLP

(57) ABSTRACT

An audio processing method by which input data are obtained that includes first sound data representing first components of a first frequency band, included in a first sound corresponding to a first sound source, second sound data representing second components of the first frequency band, included in a second sound corresponding to a second sound source, and mix sound data representing mix components of an input frequency band including a second frequency band, the mix components being included in a mix sound of the first sound and the second sound. The input data are then input to a trained estimation model, to generate at least one of first output data representing first estimated components within an output frequency band including the second frequency band, included in the first sound, or second output data representing second estimated components within the output frequency band, included in the second sound.

8 Claims, 15 Drawing Sheets

(56) References Cited

U.S. PATENT DOCUMENTS

| | | | | |
|---|---|---|---|---|
| 10,924,849 | B2 * | 2/2021 | Takahashi | G10L 21/0272 |
| 11,031,028 | B2 * | 6/2021 | Osako | G10L 21/028 |
| 11,373,672 | B2 * | 6/2022 | Mesgarani | G10L 25/30 |
| 2013/0226858 | A1 * | 8/2013 | Smaragdis | G06N 20/00 706/52 |
| 2015/0242180 | A1 * | 8/2015 | Boulanger-Lewandowski | G06N 3/044 700/94 |
| 2017/0047076 | A1 * | 2/2017 | Shi | H04S 3/008 |
| 2018/0233173 | A1 * | 8/2018 | Kanevsky | G10L 25/51 |
| 2021/0104256 | A1 * | 4/2021 | Jansson | G06N 3/045 |

OTHER PUBLICATIONS

Kitamura D. et al., "Determined Blind Source Separation Unifying Independent Vector Analysis and Nonnegative Matrix Factorization," IEEE/ACM Transactions on Audio, Speech, and Language Processing, Sep. 2016, pp. 1626-1641, vol. 24, No. 9 (16 pages).

Jansson A. et al., "Singing Voice Separation with Deep U-NET Convolutional Networks," Proceedings of the 18th International Society for Music Information Retrieval Conference (ISMIR), Oct. 23-27, 2017, pp. 745-751, Suzhou, China (seven (7) pages).

International Search Report (PCT/ISA/210) issued in PCT Application No. PCT/JP2021/006263 dated Apr. 27, 2021 with English translation (four (4) pages).

Japanese-language Written Opinion (PCT/ISA/237) issued in PCT Application No. PCT/JP2021/006263 dated Apr. 27, 2021 (three (3) pages).

English translation of document C4 (Japanese-language Written Opinion (PCT/ISA/237) previously filed on Aug. 26, 2022) issued in PCT Application No. PCT/JP2021/006263 dated Apr. 27, 2021 (three (3) pages).

* cited by examiner

FIG. 9

| | | | | |
|---|---|---|---|---|
| $D_{(m)}$ | $D_{x(m)}$ | $D_{1(m)}$ | $D_{2(m)}$ | $\alpha$ |

FIG. 12

| | | SAR [dB] | IMPROVEMENT [dB] |
|---|---|---|---|
| Drums | COMPARATIVE EXAMPLE | 21.96 | — |
| | FIRST EMBODIMENT | 22.51 | 0.55 |
| | SECOND EMBODIMENT | 22.50 | 0.54 |
| | THIRD EMBODIMENT | 27.60 | 5.64 |
| Vocals | COMPARATIVE EXAMPLE | 25.00 | — |
| | FIRST EMBODIMENT | 25.62 | 0.62 |
| | SECOND EMBODIMENT | 25.62 | 0.62 |
| | THIRD EMBODIMENT | 29.28 | 4.29 |

AUDIO PROCESSING METHOD, METHOD FOR TRAINING ESTIMATION MODEL, AND AUDIO PROCESSING SYSTEM

CROSS REFERENCE TO RELATED APPLICATIONS

This application is a Continuation application of PCT Application No. PCT/JP2021/006263, filed on Feb. 19, 2021, and is based on and claims priority from Japanese Patent Application No. 2020-033347, filed on Feb. 28, 2020, the entire contents of each of which are incorporated herein by reference.

BACKGROUND

Technical Field

The present disclosure relates to audio processing.

Background Information

Sound source separation techniques have been proposed for separating a mix of multiple sounds generated by different sound sources into isolated sounds for individual sound sources. For example, "Determined Blind Source Separation Unifying Independent Vector Analysis and Nonnegative Matrix Factorization," (Kitamura, Ono, Sawada, Kameoka, and Saruwatari, IEEE/ACM Transactions on Audio, Speech, and Language Processing, vol. 24, no. 9, pp. 1626-1641, September 2016) (hereafter, Kitamura et al.), discloses Independent Low-Rank Matrix Analysis (ILRMA), which achieves highly accurate sound source separation by taking into account independence of signals and low-ranking of sound sources.

"Singing Voice Separation with Deep U-Net Convolutional Networks," (Jansson, Humphrey, Montecchio, Bittner, Kumar, and Weyde, Proceedings of the 18th International Society for Music Information Retrieval Conference (ISMIR), 2017) (hereafter, Jansson et al.), discloses a technique for generating time-frequency domain masks for sound source separation by inputting amplitude spectrograms to a neural network.

However, in the techniques disclosed in Kitamura et al. and Jansson et al., a problem exists in that a processing load for sound source separation is excessive.

SUMMARY

Considering the foregoing, one aspect of the present disclosure aims to reduce a processing load for sound source separation.

In order to solve the above problem, an audio processing method according to one aspect of the present disclosure includes: obtaining input data including first sound data, second sound data, and mix sound data, the first sound data included in the input data representing first components of a first frequency band, included in a first sound corresponding to a first sound source, the second sound data included in the input data representing second components of the first frequency band, included in a second sound corresponding to a second sound source that differs from the first sound source, and the mix sound data included in the input data representing mix components of an input frequency band including a second frequency band that differs from the first frequency band, the mix components being included in a mix sound of the first sound and the second sound; and generating, by inputting the obtained input data to a trained estimation model, at least one of: first output data representing first estimated components of an output frequency band including the second frequency band, included in the first sound, or second output data representing second estimated components of the output frequency band, included in the second sound.

A method of training an estimation model according to one aspect of the present disclosure includes: preparing a tentative estimation model; obtaining a plurality of training data, each training data including training input data and corresponding training output data; and establishing a trained estimation model that has learned a relationship between the training input data and the training output data by machine learning in which the tentative estimation model is trained using the plurality of training data. The training input data includes first sound data, second sound data, and mix sound data, the first sound data representing first components of a first frequency band, included in a first sound corresponding to a first sound source, the second sound data representing second components of the first frequency band, included in a second sound corresponding to a second sound source that differs from the first sound source, and the mix sound data representing mix components of an input frequency band including a second frequency band that differs from the first frequency band, the mix components being included in a mix sound of the first sound and the second sound. The training output data includes at least one of: first output data representing first output components of an output frequency band including the second frequency band, included in the first sound, or second output data representing second output components of the output frequency band, included in the second sound.

An audio processing system according to one aspect of the present disclosure includes: one or more memories for storing instructions; and one or more processors communicatively connected to the one or more memories and that execute the instructions to: obtain input data including first sound data, second sound data, and mix sound data. The first sound data included in the input data represents first components of a first frequency band, included in a first sound corresponding to a first sound source, the second sound data included in the input data represents second components of the first frequency band, included in a second sound corresponding to a second sound source that differs from the first sound source, and the mix sound data included in the input data represents mix components of an input frequency band including a second frequency band that differs from the first frequency band, the mix components being included in a mix sound of the first sound and the second sound. The one or more processors then execute the instructions to generate, by inputting the obtained input data to a trained estimation model, at least one of: first output data representing first estimated components of an output frequency band including the second frequency band, included in the first sound, or second output data representing second estimated components of the output frequency band, included in the second sound.

BRIEF DESCRIPTION OF THE DRAWINGS

FIG. 9 is a schematic diagram of input data according to a third embodiment.

FIG. 12 is a table showing observation results according to the first to third embodiments.

DETAILED DESCRIPTION

A: First Embodiment

Figure 1:
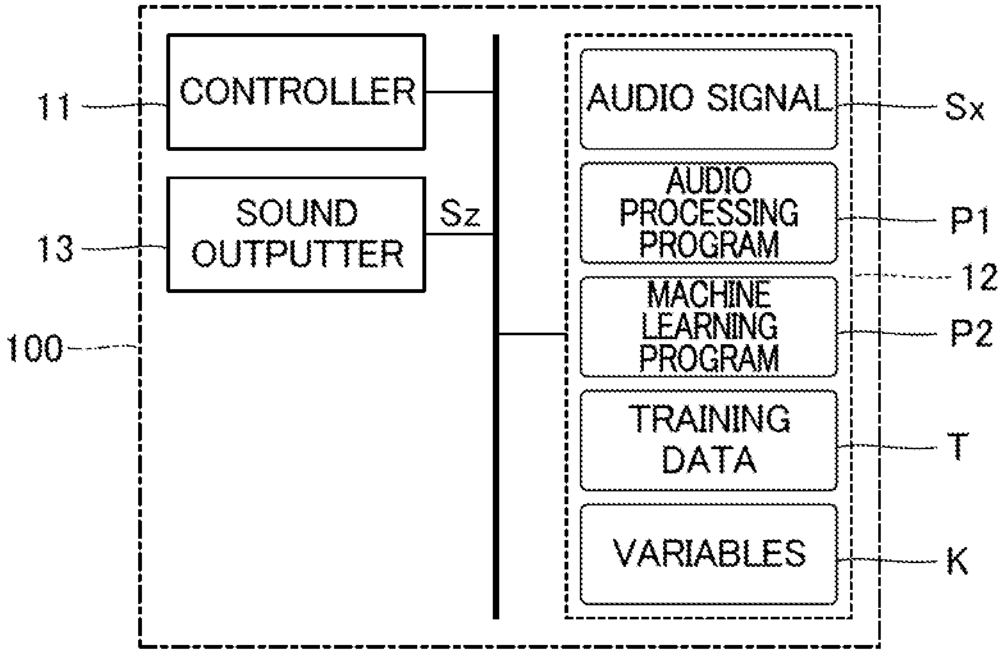
FIG. 1 is a block diagram showing a configuration of an audio processing system.

FIG. 1 is a block diagram illustrating a configuration of an audio processing system 100 according to the first embodiment of the present disclosure. The audio processing system 100 is a computer system that includes a controller 11, a storage device 12, and a sound outputter 13. The audio processing system 100 is realized by an information terminal such as a smartphone, tablet terminal, or personal computer. The audio processing system 100 can be realized by use either of a single device or of multiple devices (e.g., a client-server system) that are configured separately from each other.

The storage device 12 comprises either a single memory or multiple memories that store programs executable by the controller 11, and a variety of data used by the controller 11. The storage device 12 is constituted of a known storage medium, such as a magnetic or semiconductor storage medium, or a combination of several types of storage media. The storage device 12 may be provided separate from the audio processing system 100 (e.g., cloud storage), and the controller 11 may perform writing to and reading from the storage device 12 via a communication network, such as a mobile communication network or the Internet. In other words, the storage device 12 need not be included in the audio processing system 100.

The storage device 12 stores a time-domain audio signal Sx representative of a sound waveform. The audio signal Sx represents a sound (hereafter, "mix sound"), which is a mix of a sound produced by a first sound source (hereafter, "first sound") and a sound produced by a second sound source (hereafter, "second sound"). The first sound source and the second sound source are separate sound sources. The first sound source and the second sound source each may be a sound source such as a singer or a musical instrument. For example, the first sound is a singing voice of a singer (first sound source), and the second sound is an instrumental sound produced by a percussion instrument or other musical instrument (second sound source). The audio signal Sx is recorded in an environment in which the first sound source and the second sound source are produced in parallel, and by use of a sound receiver, such as a microphone array. However, signals synthesized by known synthesis techniques may be used as audio signals Sx. In other words, each of the first and second sound sources may be a virtual sound source.

The first sound source may comprise a single sound source or a set of multiple sound sources. Likewise, the second sound source may comprise a single sound source or a set of multiple sound sources. The first sound source and the second sound source are generally of different types, and the acoustic characteristics of the first sound differ from those of the second sound due to differences in the types of sound sources. However, the first sound source and the second sound source may be of the same type if the first sound source and the second source are separable by spatially positioning the first and the second sound sources. For example, the first sound source and the second sound source may be of the same type if the first and second sound sources are installed at different respective positions. In other words, the acoustic characteristics of the first sound and the second sound may approximate or match each other.

The controller 11 comprises either a single processor or multiple processors that control each element of the audio processing system 100. Specifically, the controller 11 is constituted of one or more types of processors, such as CPU (Central Processing Unit), SPU (Sound Processing Unit), DSP (Digital Signal Processor), FPGA (Field Programmable Gate Array), or Application Specific Integrated Circuit (ASIC) and so on. The controller 11 generates the audio signal Sz from the audio signal Sx stored in the storage device 12. The audio signal Sz is a time-domain signal representative of a sound in which one of the first sound and the second sound is emphasized relative to the other. In other words, the audio processing system 100 performs sound source separation to separate the audio signal Sx into respective sound source.

The sound outputter 13 outputs a sound represented by the audio signal Sz generated by the controller 11. The sound outputter 13 is, for example, a speaker or headphones. For convenience of explanation, a D/A converter that converts the audio signal Sz from digital to analog format, and an amplifier that amplifies the audio signal Sz are omitted from the figure. FIG. 1 shows an example of a configuration in which the sound outputter 13 is mounted to the audio processing system 100. However, the sound outputter 13 can be provided separately from the audio processing system 100 and connected thereto either by wire or wirelessly.

[1] Audio Processor 20

Figure 2:
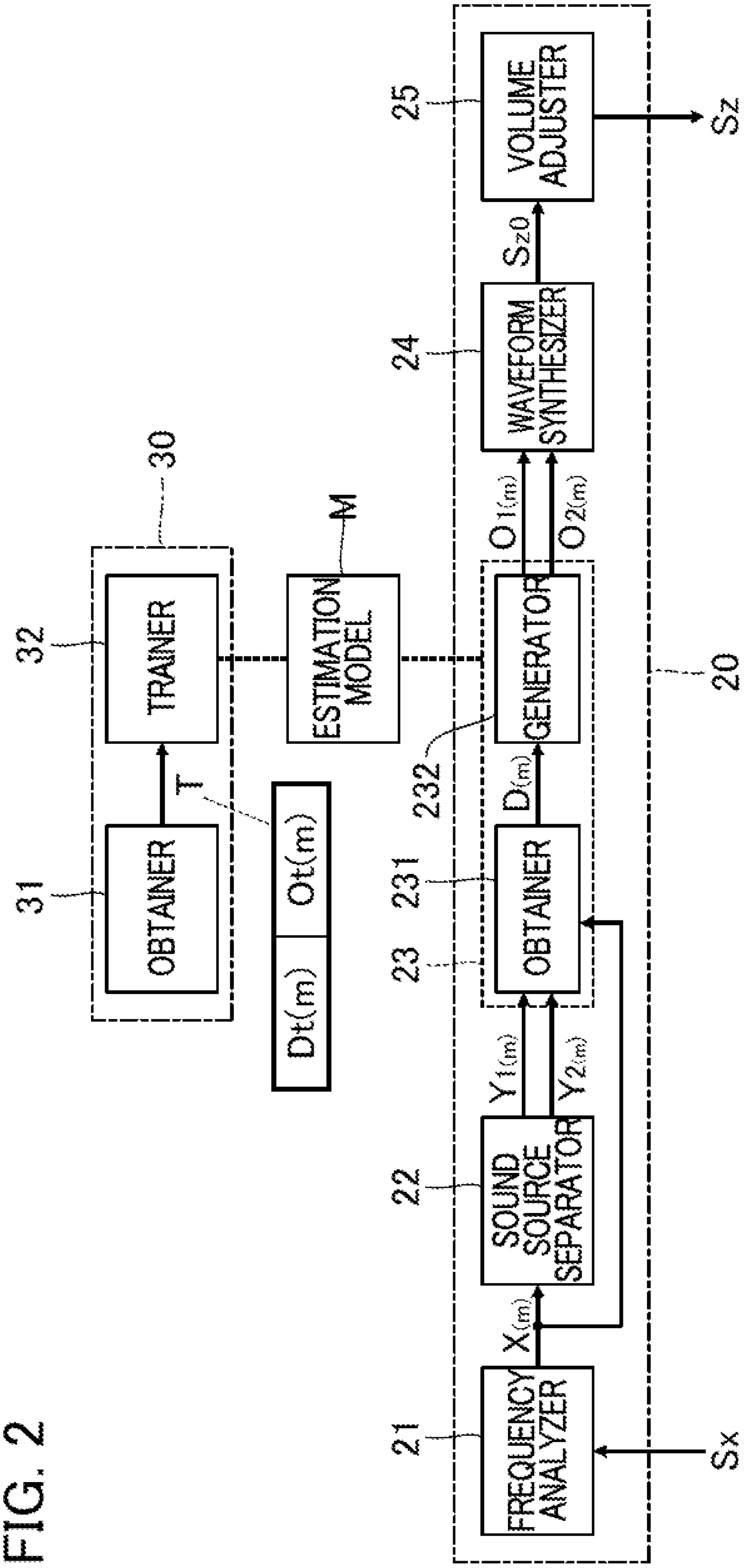
FIG. 2 is a block diagram showing a functional configuration of the audio processing system.

FIG. 2 is a block diagram illustrating a functional configuration of the audio processing system 100. As illustrated in FIG. 2, the controller 11 executes an audio processing program P1 stored in the storage device 12 to act as an audio processor 20. The audio processor 20 generates an audio signal Sz from an audio signal Sx. The audio processor 20 comprises a frequency analyzer 21, a sound source separator 22, a band extender 23, a waveform synthesizer 24, and a volume adjuster 25.

The frequency analyzer 21 generates an intensity spectrum X(m) of the audio signal Sx sequentially for each unit period (frame) on the time axis. The symbol in denotes one unit period on the time axis. The intensity spectrum X(m) is, for example, an amplitude spectrum or a power spectrum. To generate the intensity spectrum X(m), any known frequency analysis, such as for example, short-time Fourier transform or wavelet transform can be employed. A complex spectrum calculated from the audio signal Sx can be used as the intensity spectrum X(m).

Figure 3:
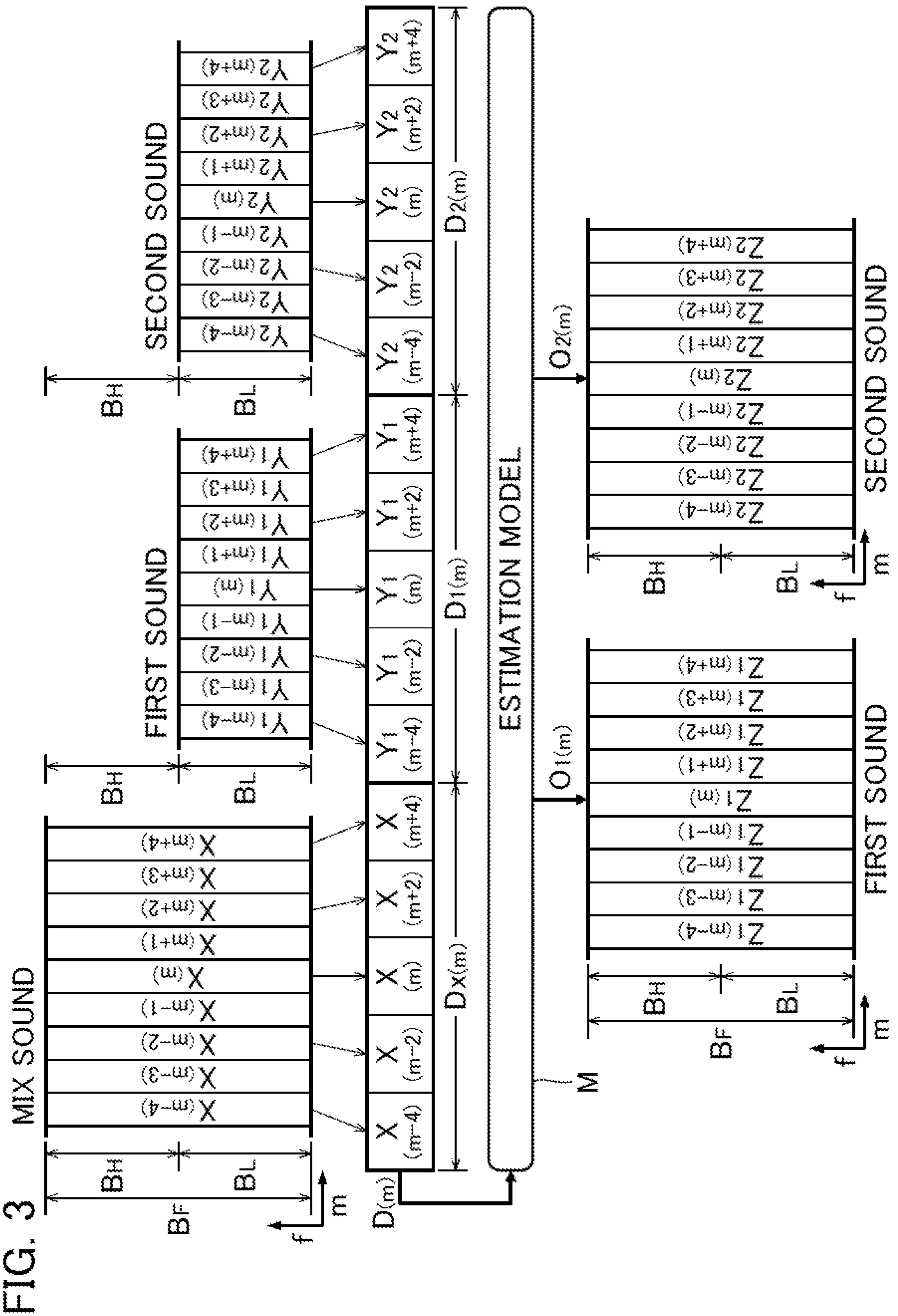
FIG. 3 is an explanatory diagram of input data and output data.

FIG. 3 shows as an example a series of intensity spectra X(m) generated from the audio signal Sx ( . . . , X(m−1), X(m), X(m+1), . . . ). The intensity spectrum X(m) is distributed within a predetermined frequency band on the frequency axis (hereafter, "whole band") BF. The whole band BF is, for example, from 0 kHz to 8 kHz.

The mix sound represented by the audio signal Sx includes components in a frequency band BL and components in a frequency band BH. The frequency band BL and the frequency band BH differ from each other within the whole band BF. The frequency band BL is lower than the frequency band BH. Specifically, the frequency band BL is below a given frequency on the frequency axis within the whole band BF, and the frequency band BH is above the given frequency within the whole band BF. Accordingly, the frequency band BL and the frequency band BH do not overlap. For example, the frequency band BL ranges from 0 kHz to less than 4 kHz, and the frequency band BH ranges from 4 kHz to 8 kHz. It is of note, however, that the bandwidth of the frequency band BL and the bandwidth of the frequency band BH may be the same as or different from each other. Each of the first and second sounds constituting the mix sound contains components of the frequency band BL and components of the frequency band BH. The frequency band BL is an example of a "first frequency band" and the frequency band BH is an example of a "second frequency band."

The sound source separator 22 in FIG. 2 performs sound source separation on the intensity spectrum X(m). Specifically, the sound source separator 22 performs sound source separation of the mix sound of the first sound and the second sound regarding the frequency band BL, to generate an intensity spectrum Y1(*m*) corresponding to the frequency band BL and an intensity spectrum Y2(*m*) corresponding to the frequency band BL. For example, the components of the frequency band BL included in the intensity spectrum X(m) corresponding to the whole band BF, are processed by the sound source separator 22. In other words, the components of the frequency band BH, included in the intensity spectrum X(m) are not processed in the sound source separation. In some embodiments, the components of the whole frequency band BF, i.e., the intensity spectrum X(m), may be processed by the sound source separator 22, to generate the intensity spectrum Y1(*m*) and the intensity spectrum Y2(*m*).

For processing of the intensity spectrum X(m) by the sound source separator 22, any known sound source separation method can be employed. For sound source separation performed by the sound source separator 22, there may be used independent component analysis (ICA), independent vector analysis (IVA), non-negative matrix factorization (NMF), multichannel NMF (MNMF), independent low-rank matrix analysis (ILRMA), independent low-rank tensor analysis (ILRTA), or independent deeply-learned matrix analysis (IDLMA), for example. In the above description, an example is given of sound source separation in the frequency domain. However, the sound source separator 22 may also perform sound source separation in the time domain on the audio signal Sx.

The sound source separator 22 generates the intensity spectrum Y1(*m*) and the intensity spectrum Y2(*m*) by sound source separation of the components of the frequency band BL, included in the intensity spectrum X(m). Intensity spectra Y1(*m*) and Y2(*m*) are generated for each unit period. As illustrated in FIG. 3, the intensity spectrum Y1(*m*) is a spectrum of components of the frequency band BL, included in the first sound (hereafter, "first components") included in the mix sound. In other words, the intensity spectrum Y1(*m*) is a spectrum obtained by emphasizing the first sound included in the components of the frequency band BL, included in the mix sound, relative to the second sound included in the components of the frequency band BL (ideally, by removing the second sound). The intensity spectrum Y2(*m*) is a spectrum of components of the frequency band BL, included in the second sound (hereafter, "second components") included in the mix sound. In other words, the intensity spectrum Y2(*m*) is a spectrum obtained by emphasizing the second sound included in the components of the frequency band BL, included in the mix sound, relative to the first sound included in the components of the frequency band BL (ideally, by removing the first sound). As will be understood from the above description, the components of the frequency band BH, included in the mix sound, are not included in the intensity spectra Y1(*m*) or Y2(*m*).

As described above, in the first embodiment, in a case in which the components of the frequency band BH, included in the mix sound represented by the audio signal Sx, are not processed in the sound source separation, the processing load for the sound source separator 22 is reduced, compared with a configuration in which sound source separation is performed for the whole band BF including both the frequency band BL and the frequency band BH.

The band extender 23 in FIG. 2 uses the intensity spectrum X(m) of the mix sound, the intensity spectrum Y1(*m*) of the first components, and the intensity spectrum Y2(*m*) of the second components, to generate output data O(m). The output data O(m) is generated for each unit period, and consists of first output data O1(*m*) and second output data O2(*m*). The first output data O1(*m*) represents an intensity spectrum Z1(*m*), and the second output data O2(*m*) represents an intensity spectrum Z2(*m*).

The intensity spectrum Z1(*m*) represented by the first output data O1(*m*) is, as illustrated in FIG. 3, the spectrum of the first sound throughout the whole band BF, including the frequency band BL and the frequency band BH. In other words, the intensity spectrum Y1(*m*) of the first sound, which has been restricted to the frequency band BL in the sound source separation, is converted to the intensity spectrum Z1(*m*) throughout the whole band BF by processing performed by the band extender 23. The intensity spectrum Z2(*m*) represented by the second output data O2(*m*) is the spectrum of the second sound throughout the whole band BF. In other words, the intensity spectrum Y2(*m*) of the second sound, which has been restricted to the frequency band BL in the sound source separation, is converted to the intensity spectrum Z2(*m*) throughout the whole band BF by the processing performed by the band extender 23. As will be understood from the above description, the band extender 23 converts the frequency band of each of the first and second sounds from the frequency band BL to the whole band BF (the frequency band BL and the frequency band BH).

As illustrated in FIG. 2, the band extender 23 includes an obtainer 231 and a generator 232. The obtainer 231 generates input data D(m) for each unit period. The input data D(m) represents a vector representation of (i) the intensity spectrum X(m) of the mix sound, (ii) the intensity spectrum Y1(*m*) of the first components, and (iii) the intensity spectrum Y2(*m*) of the second components.

As illustrated in FIG. 3, the input data D(m) includes mix sound data Dx(m), first sound data D1(*m*), and second sound data D2(*m*). The mix sound data Dx(m) represents the intensity spectrum X(m) of the mix sound. Specifically, the mix sound data Dx(m) generated for any one unit period (hereafter, "target period") includes an intensity spectrum X(m) of the target period, and intensity spectra X (X(m−4), X(m−2), X(m+2), X(m+4)) of other unit periods around the target period. More specifically, the mix sound data Dx(m) includes the intensity spectrum X(m) of the target period, the intensity spectrum X(m−2) of the unit period two units before the target period, the intensity spectrum X(m−4) of the unit period four units before the target period, the intensity spectrum X(m+2) of the unit period two units after the target period, and the intensity spectrum X(m+4) of the unit period four units after the target period.

The first sound data D1(*m*) represents the intensity spectrum Y1(*m*) of the first sound. Specifically, the first sound data D1(*m*) generated for any one target period includes an intensity spectrum Y1(*m*) of that target period and intensity spectra Y1(Y1(*m*−4), Y1(*m*−2), Y1(*m*+2), Y1(*m*+4)) of other unit periods around the target period. More specifically, the first sound data D1(*m*) includes the intensity spectrum Y1(*m*) of the target period, the intensity spectrum Y1(*m*−2) of the unit period two units before the target period, the intensity spectrum Y1(*m*−4) of the unit period four units before the target period, the intensity spectrum Y1(*m*+2) of the unit period two units after the target period, and the intensity spectrum Y1(*m*+4) of the unit period four units after the target period. As will be understood from the above description, the first sound data D1(*m*) represents the first components of the first sound of the frequency band BL.

The second sound data D2(*m*) represents the intensity spectrum Y2(*m*) of the second sound. Specifically, the second sound data D2(*m*) generated for any one target period includes an intensity spectrum Y2(*m*) of that target period and intensity spectra Y2 (Y2(*m*−4), Y2(*m*−2), Y2(*m*+2), Y2(*m*+4)) of other unit periods around the target period. More specifically, the second sound data D2(*m*) includes the intensity spectrum Y2(*m*) of the target period, the intensity spectrum Y2(*m*−2) of the unit period two units before the target period, and the intensity spectrum Y2(*m*−4) of the unit period four units before the target period, the intensity spectrum Y2(*m*+2) of the unit period two units after the target period, and the intensity spectrum Y2(*m*+4) of the unit period four units after the target period. As will be understood from the above description, the second sound data D2(*m*) represents the second components of the frequency band BL, included in the second sound.

Each element of a vector V represented by the whole input data D(m) is normalized such that the magnitude of the vector V is 1 (i.e., unit vector). For example, with respect to the input data D(m) before normalization, it is assumed that the first sound data D1(*m*), the second sound data D2(*m*), and the mix sound data Dx(m) constitute an N-dimensional vector V with N elements e1 to eN. Each of the N elements e1 to eN constituting the input data D(m) after normalization is expressed by the following Equation (1), where n=1 to N, $$E_n = \frac{e_n}{\|V\|_2}. \tag{1}$$

The symbol $\| \ \|_2$ in Equation (1) means the L2 norm expressed in Equation (2) below, and the L2 norm corresponds to an index representative of the magnitude of the vector V (hereafter, "intensity index α"), $$\|V\|_2 = \alpha = \left(\sum_{n=1}^{N} |e_n|^2\right)^{\frac{1}{2}}. \tag{2}$$

The generator 232 in FIG. 2 generates output data O(m) from the input data D(m). The output data O(m) is generated sequentially for each unit period. Specifically, the generator 232 generates the output data O(m) for each unit period from the input data D(m) for each unit period. An estimation model M is used to generate the output data O(m). The estimation model M is a statistical model that outputs the output data O(m) in a case in which the input data D(m) is supplied thereto. In other words, the estimation model M is a trained model that has learned the relationship between the input data D(m) and the output data O(m).

Figure 4:
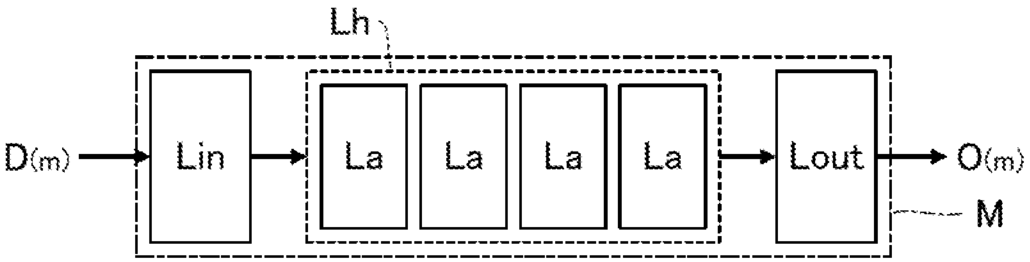
FIG. 4 is a block diagram illustrating a configuration of an estimation model.

The estimation model M is constituted of, for example, a neural network. FIG. 4 is a block diagram illustrating a configuration of the estimation model M. The estimation model M is, for example, a deep neural network including four full connected layers La in the hidden layer Lh between the input layer Lin and the output layer Lout. The activation function is, for example, a rectified linear unit (ReLU). In the first layer of the hidden layer Lh, the input data D(m) is compressed to the same number of dimensions as that of the output layer Lout. The configuration of the estimation model M is not limited thereto. For example, any form of neural network such as a recurrent neural network (RNN) or a convolutional neural network (CNN) can be used as the estimation model M. A combination of multiple types of neural networks can be used as the estimation model M. Additional elements such as long short-term memory (LSTM) can also be included in the estimation model M.

The estimation model M is realized by a combination of (i) an estimation program that causes the controller 11 to perform operations for generating output data O(m) from input data D(m) and (ii) multiple variables K (specifically, weighted values and biases) applied to the operations. The estimation program and the variables K are stored in the storage device 12. The numerical values of the respective variables K are set in advance by machine learning.

The waveform synthesizer 24 in FIG. 2 generates an audio signal Sz0 from a series of the output data O(m) generated sequentially by the band extender 23. Specifically, the waveform synthesizer 24 generates an audio signal Sz0 from a series of first output data O1(*m*) or a series of second output data O2(*m*). For example, when a user instruction to emphasize the first sound is provided, the waveform synthesizer 24 generates an audio signal Sz0 from the series of the first output data O1(*m*) (intensity spectrum Z1(*m*)). In other words, an audio signal Sz0 in which the first sound is emphasized is generated. On the other hand, when a user instruction to emphasize the second sound is provided, the waveform synthesizer 24 generates an audio signal Sz0 from the series of the second output data O2(*m*) (intensity spectrum Z2(*m*)). In other words, the audio signal Sz0 with the second sound emphasized is generated. The short-time inverse Fourier transform may be used to generate the audio signal Sz0.

As mentioned earlier, each of the elements En that constitute the input data D(m) is a value normalized using the intensity index α. Therefore, the volume of the audio signal Sz0 may differ from that of the audio signal Sx. The volume adjuster 25 generates an audio signal Sz by adjusting (i.e., scaling) the volume of the audio signal Sz0 to a volume equivalent to that of the audio signal Sx. The audio signal Sz is then supplied to the sound outputter 13, thereby being emitted as a sound wave. Specifically, the volume adjuster 25 multiplies the audio signal Sz0 by an adjustment value G that depends on a difference between the volume of the audio signal Sx and the volume of the audio signal Sz0, to generate the audio signal Sz. The adjustment value G is set such that a difference in volume between the audio signal Sx and the audio signal Sz is minimized.

Figure 5:
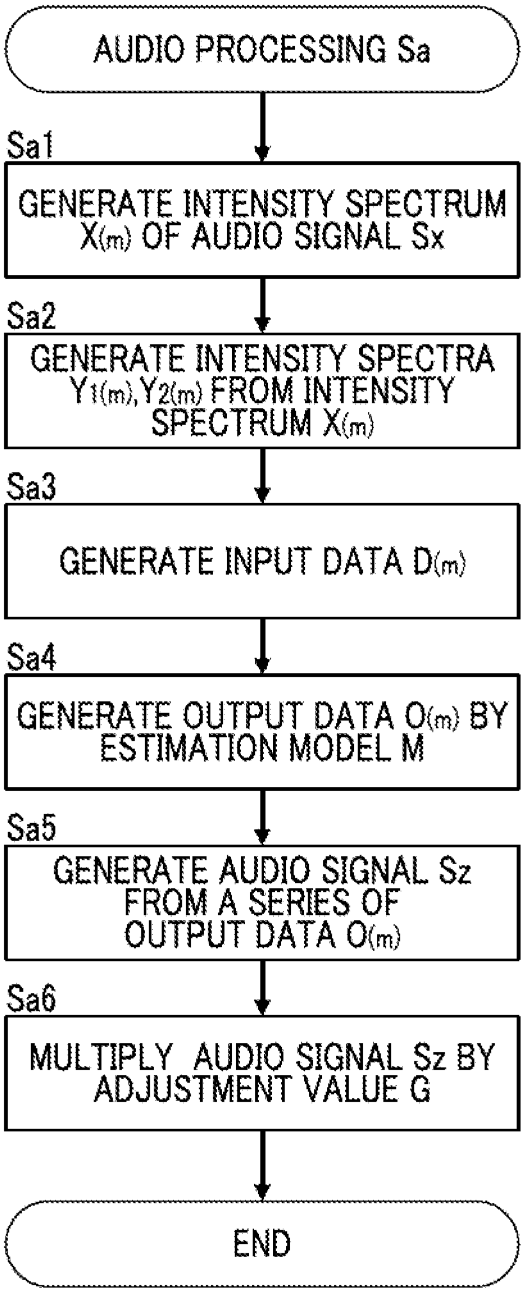
FIG. 5 is a flowchart illustrating example procedures for audio processing.

FIG. 5 shows an example procedure of processing to generate the audio signal Sz from the audio signal Sx (hereafter, "audio processing Sa"), which is executed by the controller 11. For example, the audio processing Sa is initiated by a user instruction to the audio processing system 100.

When the audio processing Sa is started, the controller 11 (frequency analyzer 21) generates for each of the multiple unit periods an intensity spectrum X(m) of the audio signal Sx (Sa1). The controller 11 (sound source separator 22) generates intensity spectra Y1(*m*) and Y2(*m*) for each unit period by sound source separation of the components of the frequency band BL, included in the intensity spectrum X(m) (Sa2).

The controller 11 (obtainer 231) generates input data D(m) for each unit period from the intensity spectrum X(m), the intensity spectrum Y1(*m*), and the intensity spectrum Y2(*m*) (Sa3). The controller 11 (generator 232) generates output data O(m) for each unit period by inputting the generated input data D(m) to the estimation model M (Sa4). The controller 11 (waveform synthesizer 24) generates an audio signal Sz0 from a series of the first output data O1(*m*) or a series of the second output data O2(*m*) (Sa5). The controller 11 (volume adjuster 25) generates an audio signal Sz by multiplying the audio signal Sz0 by the adjustment value G (Sa6).

As described above, in the first embodiment, output data O(m) representative of the components of the whole band BF that includes the frequency band BL is generated from input data D(m) including first sound data D1(*m*) and second sound data D2(*m*) each representative of the components of the frequency band BL. In other words, output data O(m) that includes the components of the whole band BF is generated even in a configuration by which sound source separation is performed only for the frequency band BL included in the mix sound represented by the audio signal Sx. Therefore, the processing load for sound source separation can be reduced.

[2] Learning Processor 30

As illustrated in FIG. 2, the controller 11 executes a machine learning program P2 stored in the storage device 12, to function as a learning processor 30. The learning processor 30 establishes a trained estimation model M to be used for audio processing Sa by machine learning. The learning processor 30 has an obtainer 31 and a trainer 32.

Figure 6:
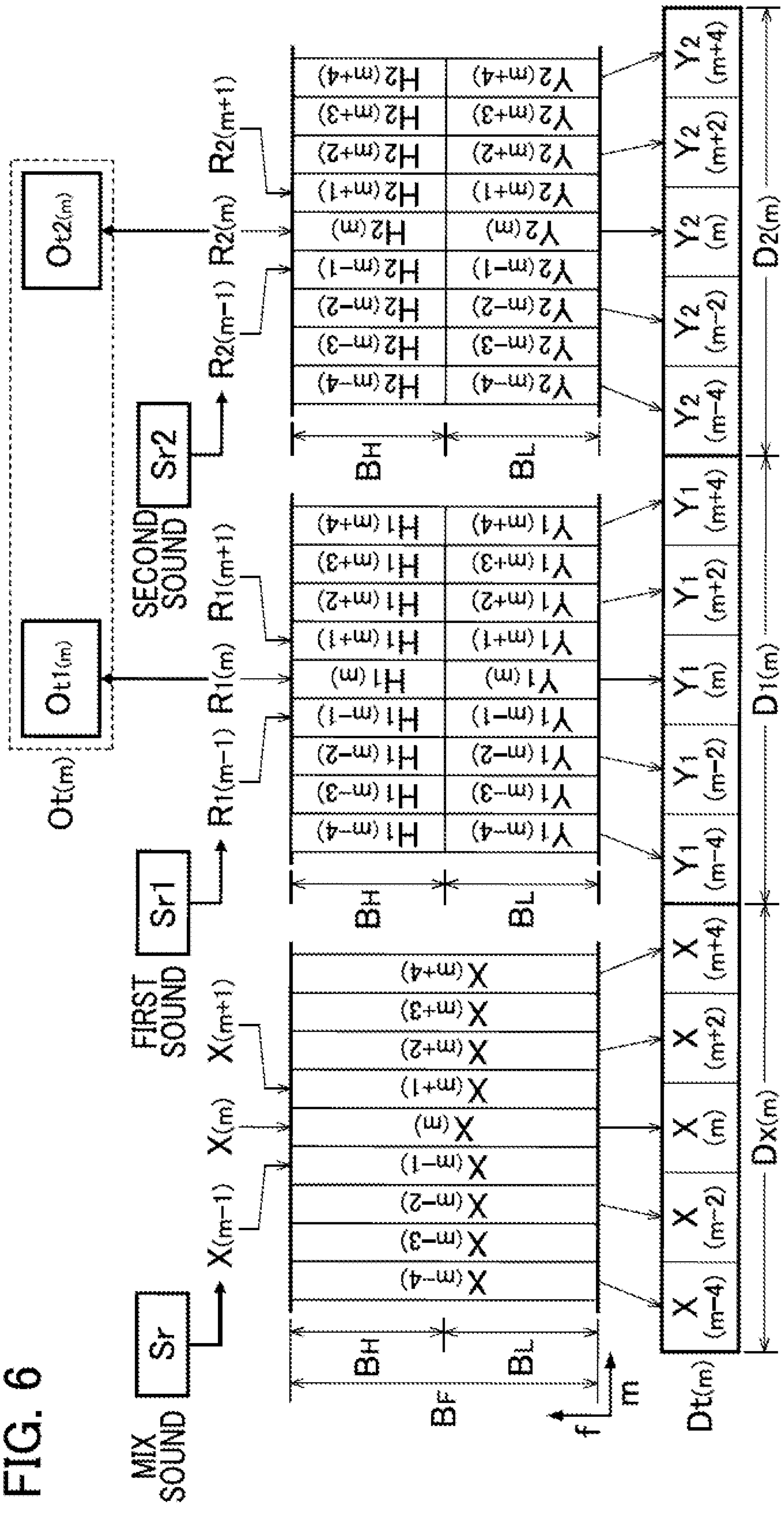
FIG. 6 is an explanatory diagram of training data.

The storage device 12 stores a plurality of training data T used for machine learning of the estimation model M. FIG. 6 is an explanatory diagram of the training data T. Each training data T is constituted of a combination of training input data Dt(m) and corresponding training output data Ot(m). Similar to the input data D(m) in FIG. 3, the training input data Dt(m) includes mix sound data Dx(m), first sound data D1(*m*), and second sound data D2(*m*).

FIG. 6 shows a reference signal Sr, a first signal Sr1, and a second signal Sr2. The reference signal Sr is a time-domain signal representative of a mix of the first sound produced by the first sound source and the second sound produced by the second sound source. The mix sound represented by the reference signal Sr extends throughout the whole band BF, including the frequency band BL and the frequency band BH. The reference signal Sr is recorded, for example, using a sound receiver in an environment where the first and the second sound sources produce sounds in parallel. The first signal Sr1 is a time-domain signal representative of the first sound, and the second signal Sr2 is a time-domain signal representative of the second sound. Each of the first and second sounds extends throughout the whole band BF, including the frequency band BL and the frequency band BH. The first signal Sr1 is recorded in an environment where only the first sound source produces sound. The second signal Sr2 is recorded in an environment where only the second sound source produces sound. The reference signal Sr may be generated by mixing the first signal Sr1 and the second signal Sr2, which are recorded separately from each other.

FIG. 6 shows a series of intensity spectra X(m) of the reference signal Sr ( . . . , X(m−1), X(m), X(m+1), . . . ), a series of intensity spectra R1(*m*) of the first signal Sr1 ( . . . , R1(*m*−1), R1(*m*), R1(*m*+1), . . . ), and a series of intensity spectra R2(*m*) of the second signal Sr2 ( . . . , R2(*m*−1), R2(*m*), R2(*m*+1), . . . ). Of the training input data Dt(m), the mix sound data Dx(m) is generated from the intensity spectrum X(m) of the reference signal Sr. Specifically, the mix sound data Dx(m) of any one target period includes an intensity spectrum X(m) of that target period and intensity spectra X (X(m−4), X(m−2), X(m+2), X(m+4)) of other unit periods around the target period, as shown in the example in FIG. 3.

The first signal Sr1 includes components of the frequency band BL and components of the frequency band BH. An intensity spectrum R1(*m*) of the first signal Sr1 is constituted of an intensity spectrum Y1(*m*) of the frequency band BL and an intensity spectrum H1(*m*) of the frequency band BH. The first sound data D1(*m*) of the training input data Dt(m) represents, of the intensity spectrum R1(*m*), an intensity spectrum Y1(*m*) of the frequency band BL. Specifically, the first sound data D1(*m*) of the target period is constituted of an intensity spectrum Y1(*m*) of the target period and intensity spectra Y1(Y1(*m*−4), Y1(*m*−2), Y1(*m*+2), Y1(*m*+4)) of other unit periods around the target period.

Similarly to the first signal Sr1, the second signal Sr2 includes components of the frequency band BL and components of the frequency band BH. An intensity spectrum R2(*m*) of the second signal Sr2 is constituted of an intensity spectrum Y2(*m*) of the frequency band BL and an intensity spectrum H2(*m*) of the frequency band BH. The second sound data Dt2(*m*) of the training input data Dt(m) represents, of the intensity spectrum R2(*m*), an intensity spectrum Y2(*m*) of the frequency band BL. Specifically, the second sound data Dt2(*m*) of the target period is constituted of an intensity spectrum Y2(*m*) of that target period and intensity spectra Y2(Y2(*m*−4), Y2(*m*−2), Y2(*m*+2), Y2(*m*+4)) of other unit periods around the target period.

The training output data Ot(m) of the training data T is a ground truth. The ground truth is constituted of first output data Ot1(*m*) and second output data Ot2(*m*). The first output data Ot1(*m*) represents the intensity spectrum R1(*m*) of the first signal Sr1. In other words, the first output data Ot1(*m*) is, of the mix sound represented by the reference signal Sr, a spectrum of the first sound throughout the whole band BF. The second output data Ot2(*m*) represents the intensity spectrum R2(*m*) of the second signal Sr2. In other words, the second output data Ot2(*m*) is, of the mix sound represented by the reference signal Sr, a spectrum of the second sound throughout the whole band BF.

Each element of a vector V, which is represented by the whole training input data Dt(m), is normalized such that the magnitude of the vector V is 1, similarly to the input data Dt(m) described above. Similarly, each element of a vector V represented by the whole training output data Ot(m) is normalized such that the magnitude of the vector V is 1.

The obtainer 31 of FIG. 2 obtains the training data T from the storage device 12. In a configuration in which the reference signal Sr, the first signal Sr1, and the second signal Sr2 are stored in the storage device 12, the obtainer 31 generates a plurality of training data T from the reference signal Sr, the first signal Sr1, and the second signal Sr2. Thus, the process of obtaining by the obtainer 31 includes not only the process of reading from the storage device 12 the training data T prepared in advance, but also the process of generating the training data T by the obtainer 31.

The trainer 32 establishes an estimation model M by way of processing using the plurality of training data T (hereafter, "learning processing Sb"). The learning processing Sb is supervised machine learning that uses the training data T. Specifically, the trainer 32 repeatedly updates the multiple variables K that define the estimation model M such that a loss function L representative of an error between (i) output data O(m) generated by a tentative estimation model M in response to a supply of the input data Dt(m) of the training data T and (ii) the output data Ot(m) contained in the same training data T is reduced (ideally minimized). Thus, the estimation model M learns a potential relationship between the input data Dt(m) and the output data Ot(m) in the training data T. In other words, after training by the trainer 32, the estimation model M outputs, for unknown input data D(m), statistically valid output data O(m) based on that relationship.

The loss function L is expressed, for example, by the following Equation (3), $$L=\varepsilon[O_1(m),O_{t1}(m)]\varepsilon[O_2(m),O_{t2}(m)] \quad (3)$$

The symbol ε[a,b] in Equation (3) is an error between element a and element b (e.g., a mean square error or cross entropy function).

Figure 7:
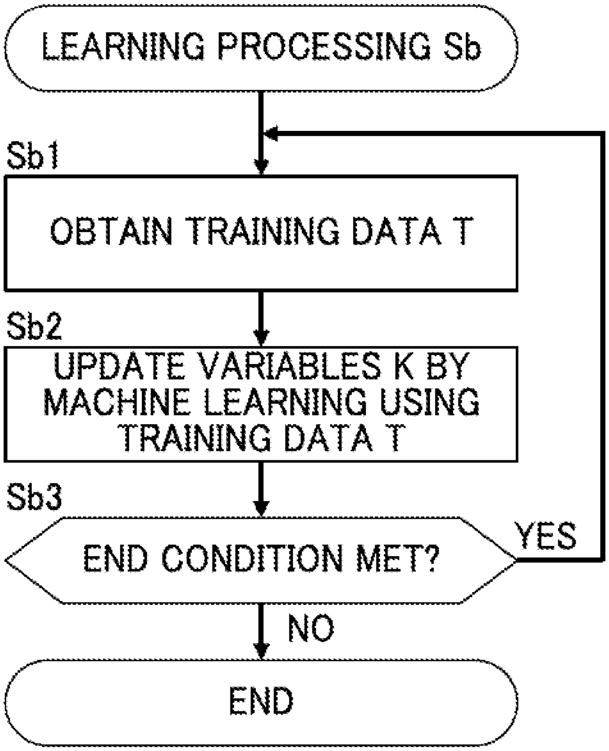
FIG. 7 is a flowchart illustrating example procedures for learning processing.

FIG. 7 is a flowchart showing an example procedure of the learning processing Sb of training a tentative estimation model M prepared in advance. For example, the learning processing Sb is initiated by a user instruction provided to the audio processing system 100.

The controller 11 (obtainer 31) obtains training data T from the storage device 12 (Sb1). The controller 11 (trainer 32) performs machine learning in which the tentative estimation model M is trained using the obtained training data T (Sb2). That is, the multiple variables K of the tentative estimation model M are repeatedly updated such that the loss function L is reduced between (i) the output data O(m) generated by the estimation model M from the input data Dt(m) of the training data T and (ii) the output data Ot(m) (i.e., the ground truth) of the training data T. To update the multiple variables K in accordance with the loss function L, an error back propagation method is used, for example.

The controller 11 determines whether a condition for ending the learning processing Sb is met (Sb3). The end condition is, for example, that the loss function L falls below a predetermined threshold or that the amount of change in the loss function L falls below a predetermined threshold. If the end condition is not met (Sb3: NO), the controller 11 (obtainer 31) obtains from the storage device 12 training data T that the controller 11 has not obtained (Sb1). In other words, the process of obtaining training data T (Sb1) and the process of updating the multiple variables K using the obtained training data T (Sb2) are repeated until the end condition is met. When the end condition is met (Sb3: YES), the controller 11 ends the learning processing Sb.

As explained above, in the first embodiment, the estimation model M is established such that the output data O(m) representative of components of both the frequency band BL and the frequency band BH are generated from the input data D(m) including the first sound data D1(*m*) and the second sound data D2(*m*) each representative of components of the frequency band BL. In other words, even in a configuration where sound source separation is performed only for the frequency band BL included in the mix sound represented by the audio signal Sx, the output data O(m) including the components of the frequency band BH is generated by using the trained estimation model M. Therefore, the processing load for sound source separation can be reduced.

B: Second Embodiment

The second embodiment is described below. For elements whose functions are similar to those of the first embodiment in each of the following embodiments and modifications, the reference signs used in the description of the first embodiment are used and detailed descriptions of such elements are omitted as appropriate.

In the first embodiment, an example is given of a configuration in which the mix sound data Dx(m) includes both mix components of the frequency band BL and mix components of the frequency band BH. However, since the components of the first sound of the frequency band BL are included in the first sound data D1(*m*), and the components of the frequency band BL in the second sound are included in the second sound data D2(*m*), it is not essential that the mix sound data Dx(m) includes the mix components of the frequency band BL. Taking the foregoing into account, in the second embodiment, the mix sound data Dx(m) does not include the mix components of the frequency band BL, included in the mix sound.

Figure 8:
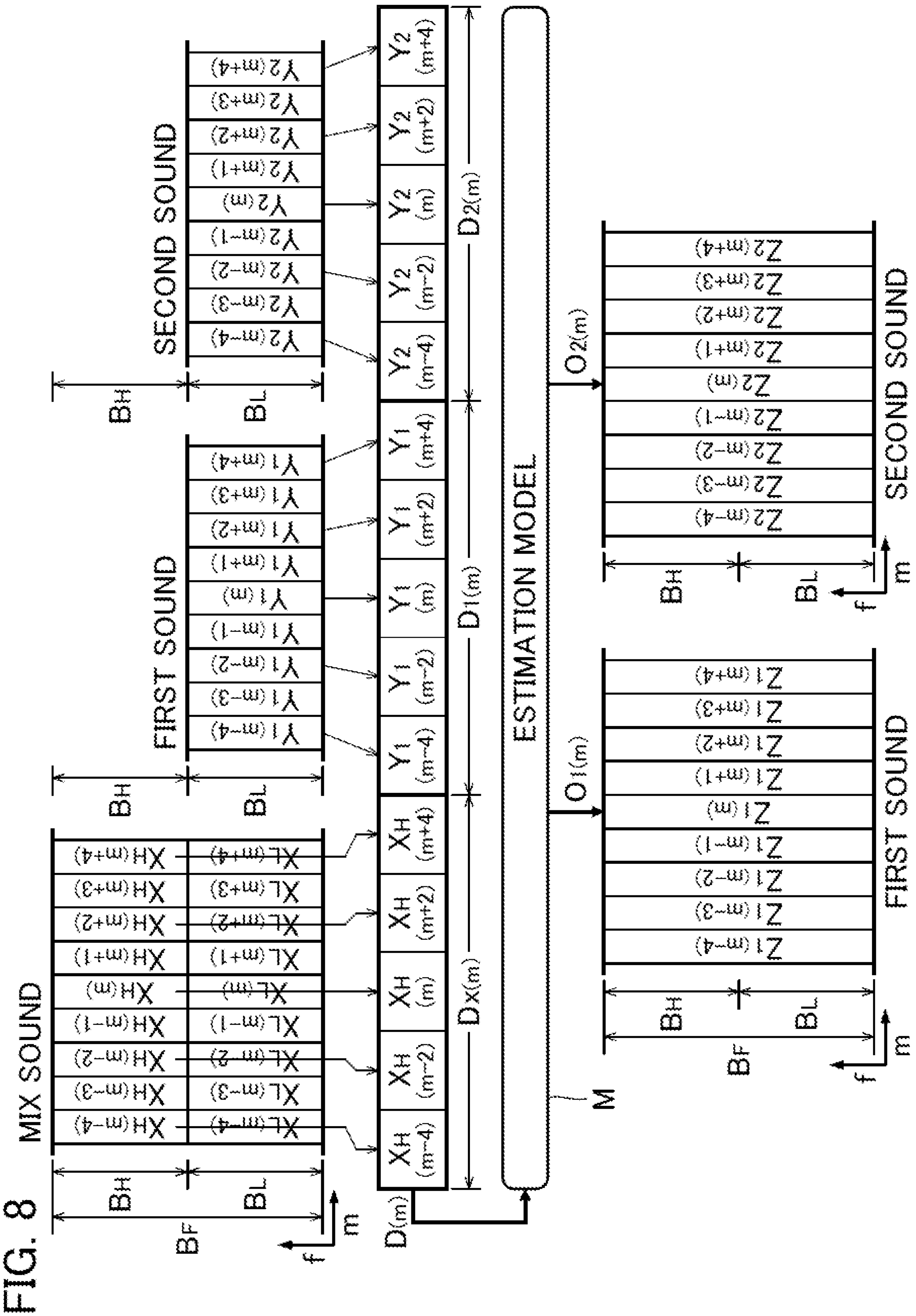
FIG. 8 is an explanatory diagram of input data and output data according to a second embodiment.

FIG. 8 is a schematic diagram of input data D(m) in the second embodiment. The intensity spectrum X(m) of the audio signal Sx is divided into an intensity spectrum XL(m) of the frequency band BL and an intensity spectrum XH(m) of the frequency band BH. The mix sound data Dx(m) of the input data D(m) represents the intensity spectrum XH(m) of the frequency band BH. Specifically, the mix sound data Dx(m) generated for one target period is an intensity spectrum XH(m) of that target period and intensity spectra XH (XH(m−4), XH(m−2), XH(m+2), XH(m+4)) of other unit periods around that target period. In other words, the mix sound data Dx(m) of the second embodiment does not include the mix components of the frequency band BL (intensity spectrum XL(m)), included in the mix sound of the first sound and the second sound. As in the first embodiment, the sound source separator 22 of the second embodiment performs sound source separation of the mix components included in the mix sound of the first sound and the second sound (i.e., the intensity spectrum X(m)) regarding the frequency band BL.

In the above description, the input data D(m) used for audio processing Sa is shown as an example. Similarly, the training input data Dt(m) used for the learning processing Sb includes the mix sound data Dx(m) representative of the components of the frequency band BH included in the mix sound represented by the reference signal Sr. In other words, the mix sound data Dx(m) for training represents, of the intensity spectrum X(m) of the reference signal Sr, the intensity spectrum XH(m) of the frequency band BH, and the intensity spectrum XL(m) of the frequency band BL is not reflected in the mix sound data Dx(m).

In the second embodiment, the same effects as those in the first embodiment are realized. Further, in the second embodiment, the mix sound data Dx(m) does not include the components within the frequency band BL, included in the mix sound. Therefore, compared with a configuration in which the mix sound data Dx(m) includes components of the whole band BF, there is an advantage that the processing load of the learning processing Sb and the size of the estimation model M are reduced.

In the first embodiment, an example is given of the mix sound data Dx(m) representative of mix components of the whole band BF, included in the mix sound. In the second embodiment, an example is given of the mix sound data Dx(m) representative of mix components of the frequency band BH, included in the mix sound. As will be understood from the above examples, the mix sound data Dx(m) is comprehensively expressed as data representative of mix components of an input frequency band including the frequency band BH, included in the mix sound. In other words, the mix sound data Dx(m) represents the mix components of the input frequency band that does not include the frequency band BL, included in the mix sound.

C: Third Embodiment

Figure 9:
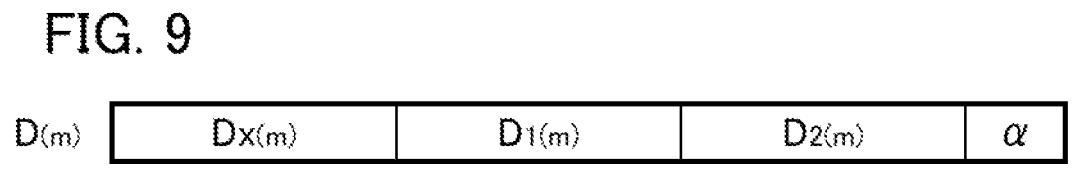

FIG. 9 is a schematic diagram of input data D(m) in the third embodiment. The input data D(m) in the third embodiment includes an intensity index α in addition to mix sound data Dx(m), first sound data D1(*m*), and second sound data D2(*m*). The intensity index α is an index representative of the magnitude (e.g., L2 norm) of a vector V expressed by the entire input data D(m), as described above, and is calculated by Equation (2) described above. Similarly, training input data Dt(m) used in the learning processing Sb includes an intensity index α corresponding to the magnitude of a vector V expressed by the input data Dt(m), in addition to the mix sound data Dx(m), the first sound data D1(*m*), and the second sound data D2(*m*). The mix sound data Dx(m), the first sound data D1(*m*), and the second sound data D2(*m*) are the same as those in the first or the second embodiment.

Figure 10:
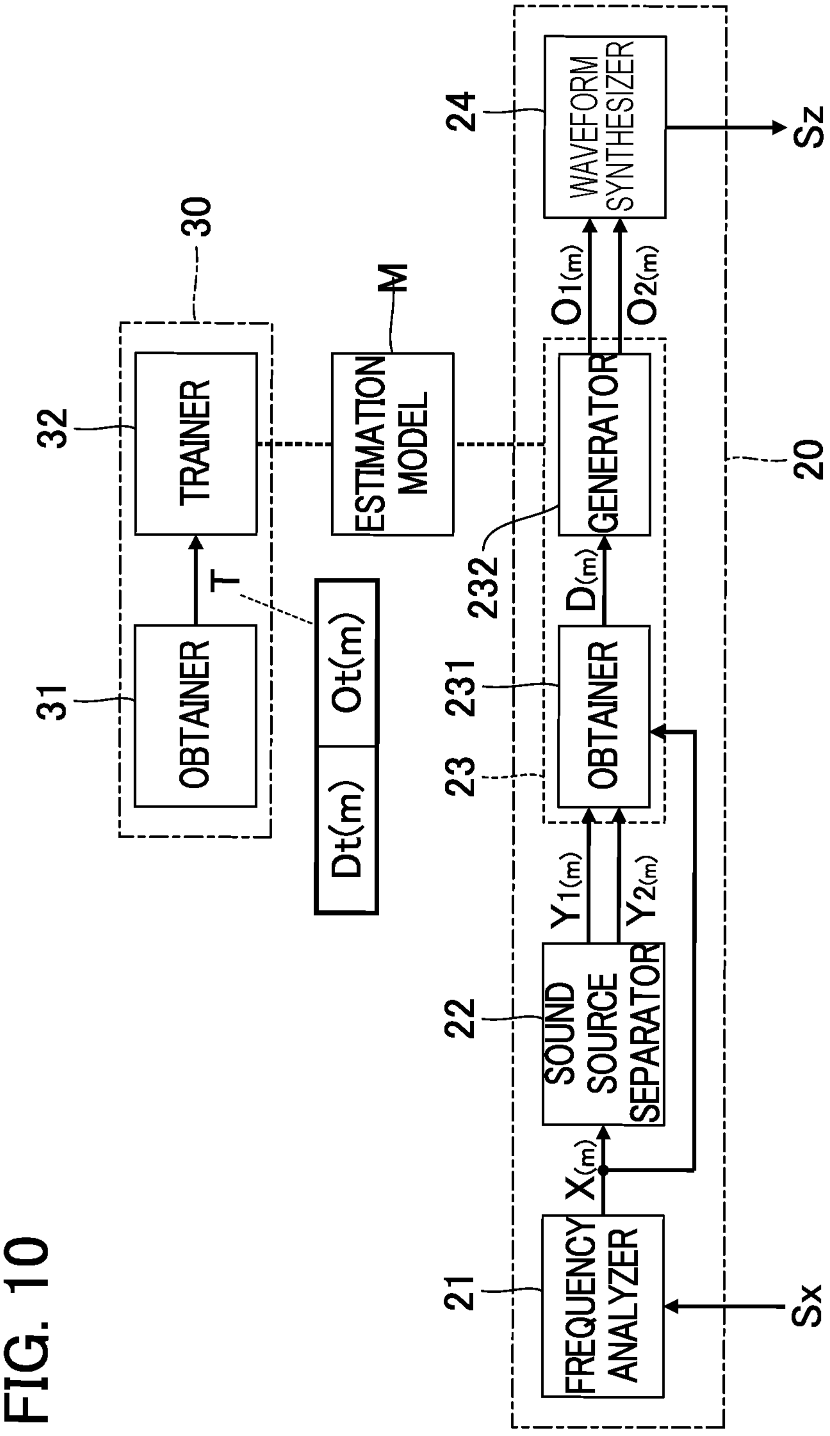
FIG. 10 is a block diagram illustrating a functional configuration of an audio processing system according to the third embodiment.

FIG. 10 is a block diagram showing a functional configuration of an audio processing system 100 according to the third embodiment. Since the input data D(m) in the third embodiment includes the intensity index α, output data O(t) reflecting the intensity index α is output from the estimation model M. Specifically, the audio signal Sz generated by the waveform synthesizer 24 based on the output data O(t) has the same loudness as that of the audio signal Sx. Accordingly, the volume adjuster 25 (Step Sa6 in FIG. 5) described as an example in the first embodiment is omitted in the third embodiment. In other words, an output signal by the waveform synthesizer 24 (audio signal Sz0 in the first embodiment) is output as the final audio signal Sz.

In the third embodiment, the same effects as those in the first embodiment are realized. In the third embodiment, since the intensity index α is included in the input data D(m), output data O(m) representative of the components of the loudness corresponding to the mix sound is generated. Therefore, the process of adjusting the intensity of the sound represented by the first output data O1(*m*) and the second output data O2(*m*) (volume adjuster 25) unnecessary.

Figure 11:
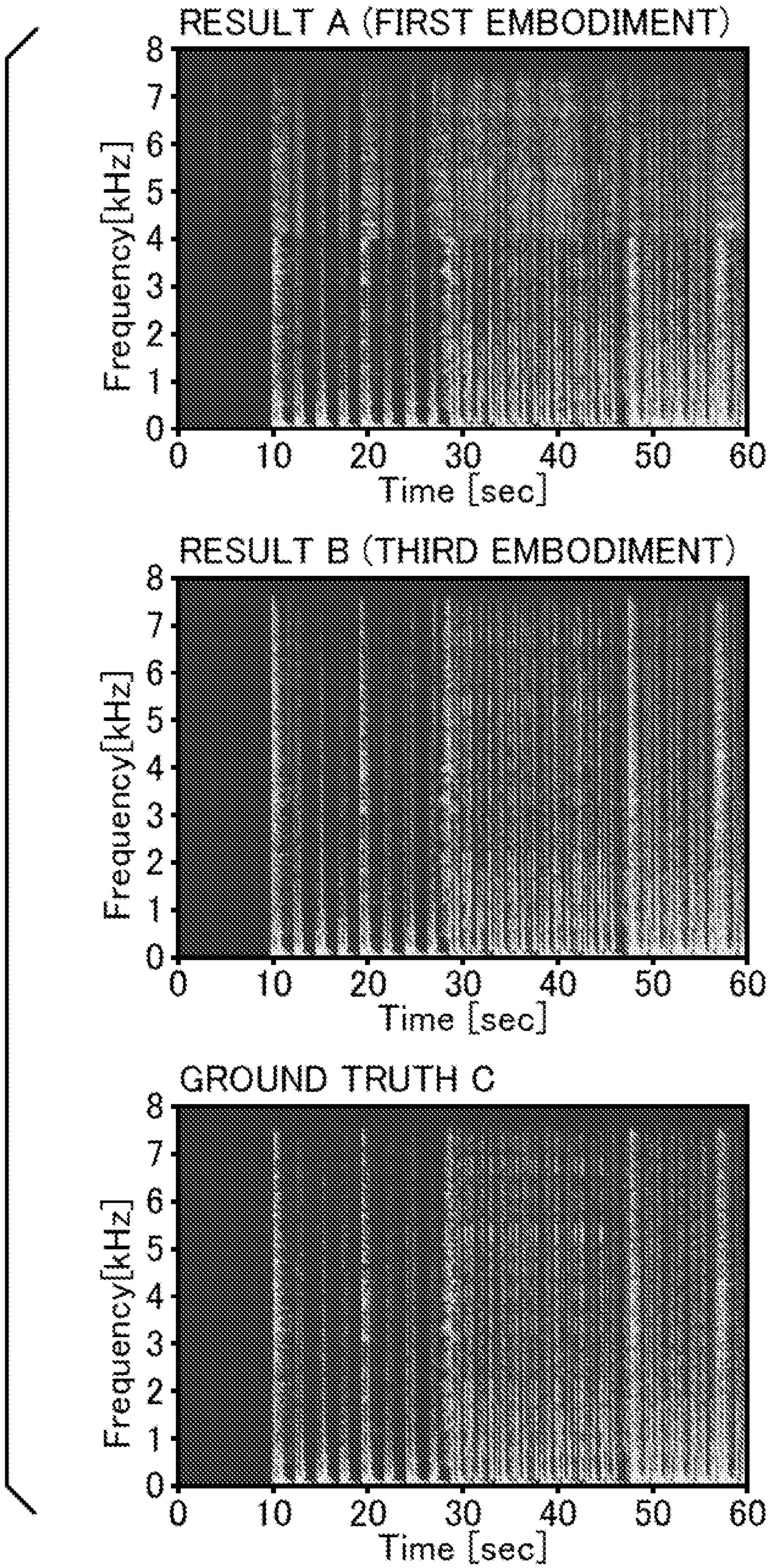
FIG. 11 is an explanatory diagram of the effects of the first and third embodiments.

FIG. 11 illustrates the effects of the first and third embodiments. Result A in FIG. 11 is an amplitude spectrogram of an audio signal Sz generated according to the first embodiment, and Result B in FIG. 11 is an amplitude spectrogram of an audio signal Sz generated according to the third embodiment. In Result A and Result B, a case is assumed in which the audio signal Sz representative of a percussion sound (first sound) is generated by performing the audio processing Sa on an audio signal Sx representative of the mix sound of the percussion sound and a singing voice (second sound). Ground Truth C in FIG. 11 is an amplitude spectrogram of the percussion sound produced alone.

From Result A in FIG. 11, it can be confirmed that with the configuration of the first embodiment it is possible to generate an audio signal Sz close to Ground Truth C. Also, from Result B in FIG. 11, it can be confirmed that with the configuration of the third embodiment, in which the input data D(m) includes the intensity index α, it is possible to generate an audio signal Sz that is sufficiently closer to Ground Truth C when compared with the first embodiment.

FIG. 12 is a table of the observation results for the first through the third embodiments. In FIG. 12, it is assumed that an audio signal Sz representative of the percussion sound (Drums) and an audio signal Sz representative of the singing voice (Vocals) are generated by performing the audio processing Sa on an audio signal Sx representative of the mix sound of the percussion sound (first sound) and the singing voice (second sound). FIG. 12 shows Sources to Artifacts Ratios (SARs), which is effective as an evaluation index, and the amount of SAR improvement is illustrated for each of the first through third embodiments. The amount of SAR improvement is the amount of SAR improvement with respect to the comparative example. In the comparative example, an SAR as of when the components of the frequency band BH are uniformly set to zero in the audio signal Sz is illustrated as a reference.

As will be apparent from FIG. 12, the SAR is improved in the first and second embodiments. As will also be apparent from FIG. 12 the third embodiment achieves highly accurate sound source separation for both percussion sound and singing voice sound, compared with the first and second embodiments.

D: Fourth Embodiment

In a learning processing Sb of the fourth embodiment, the loss function L expressed by Equation (3) is replaced by a loss function L expressed by the following Equation (4), $$L=\varepsilon[O_1(m),O_{t1}(m)]+\varepsilon[O_2(m),O_{t1}(m)]+\varepsilon[X_H(m),O_{1H}(m)+O_{2H}(m)] \quad (4)$$

The symbol O1H(m) in Equation (4) is an intensity spectrum of the frequency band BH, included in the intensity spectrum Z1(*m*) represented by the first output data O1(*m*). The symbol O2H(m) is an intensity spectrum of the frequency band BH, included in the intensity spectrum Z2(*m*) represented by the second output data $O_2$(m). Thus, the third term in the right-hand side of Equation (4) means an error between (i) the intensity spectrum XH(m) of the frequency band BH, included in the intensity spectrum X(m) of the reference signal Sr and (ii) the sum (H1(*m*)+H2(*m*)) of the intensity spectrum H1(*m*) and the intensity spectrum H2(*m*). As will be understood from the above description, the trainer 32 of the fourth embodiment trains the estimation model M under a condition (hereafter, "additional condition") that a mix of the components of the frequency band BH, included in the intensity spectrum Z1(*m*) and the components of the frequency band BH included the intensity spectrum Z2(*m*) approximates or matches the components of the frequency band BH (intensity spectrum XH(m)), included in the intensity spectrum X(m) of the mix sound.

In the fourth embodiment, the same effects as those in the first embodiment are realized. In addition, according to the fourth embodiment, compared with the configuration that uses the trained estimation model M without the additional condition, it is possible to estimate with high accuracy the components of the frequency band BH, included in the first sound (first output data O1(*m*)), and the components of the frequency band BH, included in the second sound (second output data O2(*m*)). The configuration of the fourth embodiment is similarly applicable to the second and third embodiments.

E: Fifth Embodiment

Figure 13:
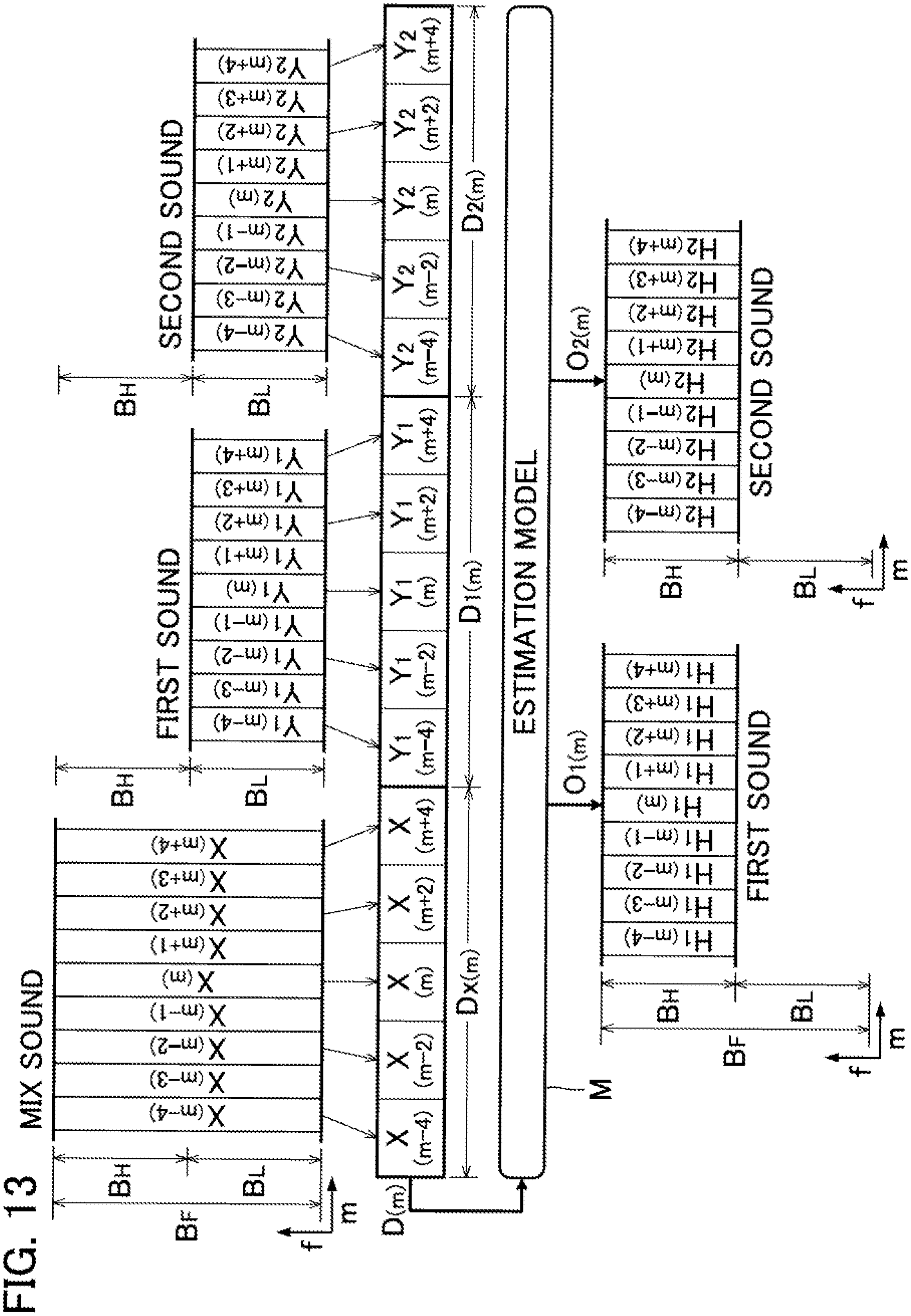
FIG. 13 is an explanatory diagram of input data and output data according to a fifth embodiment.

FIG. 13 is a schematic diagram of input data D(m) and output data O(m) in the fifth embodiment. In the first embodiment, the first output data O1(*m*) in the output data O(m) represents the intensity spectrum Z1(*m*) throughout the whole band BF, and the second output data O2(*m*) represents the intensity spectrum Z2(*m*) throughout the whole band BF. In the fifth embodiment, first output data O1(*m*) represents components of the frequency band BH, included in the first sound. That is, the first output data O1(*m*) represents an intensity spectrum H1(*m*) of the frequency band BH, included in the intensity spectrum Z1(*m*) of the first sound, and does not include an intensity spectrum of the frequency band BL. Similarly, in the fifth embodiment, second output data O2(*m*) represents components of the frequency band BH, included in the second sound. That is, the second output data O2(*m*) represents an intensity spectrum H2(*m*) of the frequency band BH, included in the intensity spectrum Z2(*m*) of the second sound, and does not include an intensity spectrum of the frequency band BL.

Figure 14:
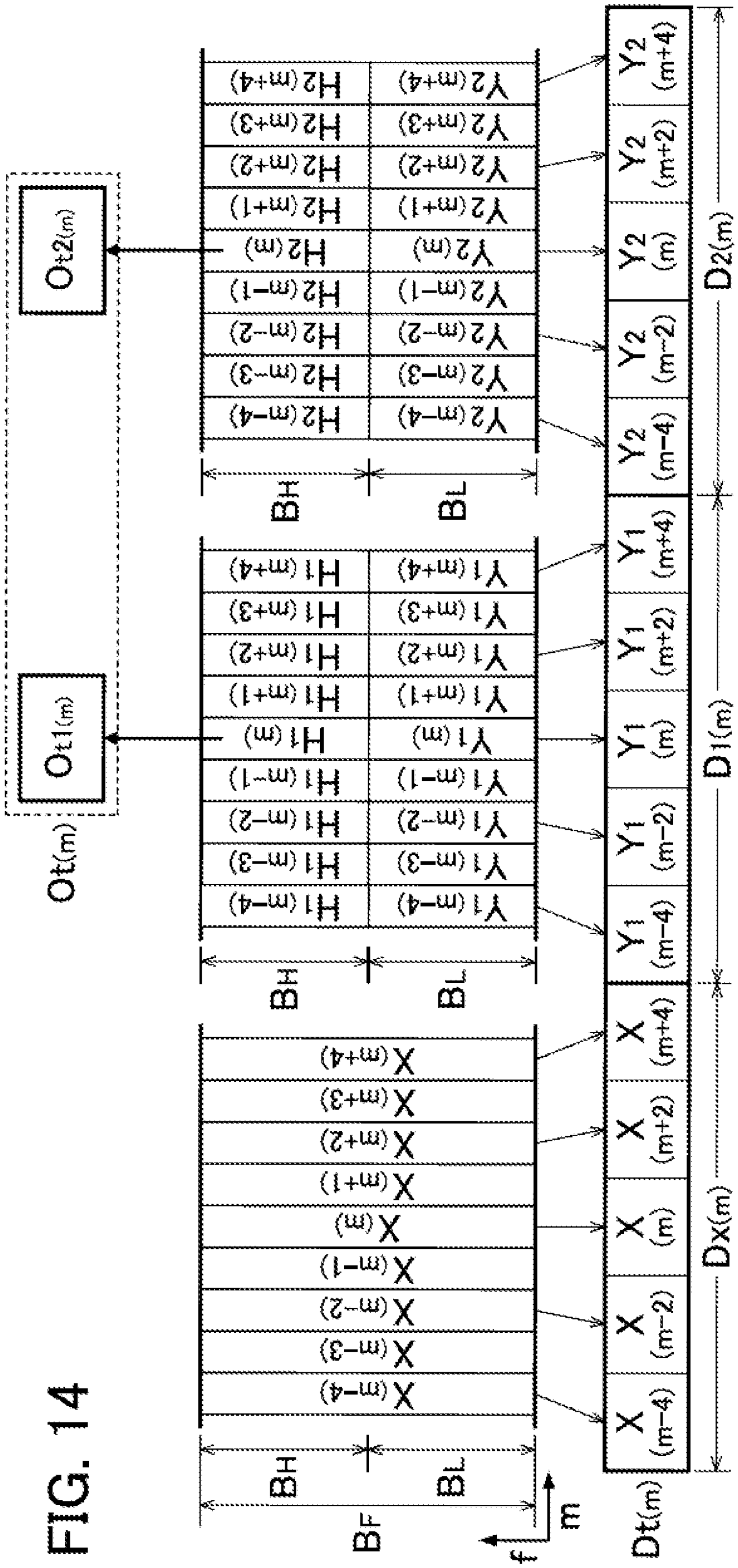
FIG. 14 is an explanatory diagram of training data according to the fifth embodiment.

FIG. 14 is a schematic diagram of input data Dt(m) and training output data Ot(m) in the fifth embodiment. In the first embodiment, the first output data Ot1(*m*) in the training output data Ot(m) is the intensity spectrum R1(*m*) of the first sound throughout the whole band BF, and the second output data Ot2(*m*) represents the intensity spectrum R2(*m*) of the second sound throughout the whole band BF. In the fifth embodiment, first output data Ot1(*m*) represents first output components of the frequency band BH, included in the first sound. That is, the first output data Ot1(*m*) represents an intensity spectrum H1(*m*) of the frequency band BH, included in the intensity spectrum R1(*m*) of the first sound and does not include an intensity spectrum Y1(*m*) of the frequency band BL. As will be understood from the above examples, the first output data Ot1(*m*) of the training output data Ot(m) is comprehensively expressed as first output components of an output frequency band including the frequency band BH, included in the first sound. Similarly, in the fifth embodiment, second output data Ot2(*m*) represents second output components of the frequency band BH, included in the second sound. That is, the second output data Ot2(*m*) represents an intensity spectrum H2(*m*) of the frequency band BH, included in the intensity spectrum R2(*m*) of the second sound and does not include an intensity spectrum Y2(*m*) of the frequency band BL. As will be understood from the above examples, the second output data Ot2(*m*) of the training output data Ot(m) is comprehensively expressed as second output components of the output frequency band including the frequency band BH, included in the second sound.

Figure 15:
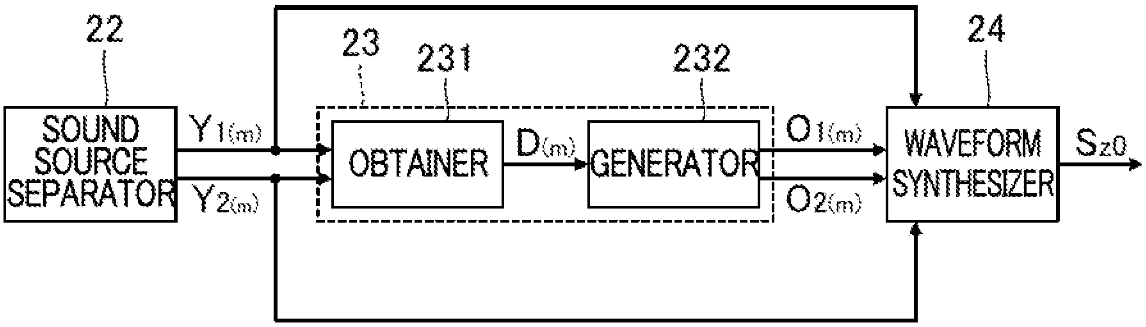
FIG. 15 is a block diagram showing a functional configuration of the audio processing system according to the fifth embodiment.

FIG. 15 is a block diagram illustrating a part of a configuration of an audio processor 20 in the fifth embodiment. In the fifth embodiment, the first output data O1(*m*) representative of the intensity spectrum H1(*m*) of the frequency band BH, included in the first sound, is supplied from the audio processor 20 to a waveform synthesizer 24. In addition, the intensity spectrum Y1(*m*) of the frequency band BL, included in the first sound, is supplied to the waveform synthesizer 24 from the sound source separator 22. When a user instruction to emphasize the first sound is provided, the waveform synthesizer 24 synthesizes the intensity spectrum H1(*m*) and the intensity spectrum Y1(*m*), thereby to generate an intensity spectrum Z1(*m*) throughout the whole band BF, and generates an audio signal Sz0 from a series of the intensity spectra Z1(*m*). The intensity spectrum Z1(*m*) is, for example, a spectrum with the intensity spectrum Y1(*m*) in the frequency band BL and the intensity spectrum H1(*m*) in the frequency band BH.

Further, in the fifth embodiment, the second output data O2(*m*) representative of the intensity spectrum H2(*m*) of the frequency band BH, included in the second sound, is supplied to the waveform synthesizer 24 from the audio processor 20. In addition, the intensity spectrum Y2(*m*) of the frequency band BL, included in the second sound, is supplied to the waveform synthesizer 24 from the sound source separator 22. When a user instruction to emphasize the second sound is provided, the waveform synthesizer 24 synthesizes the intensity spectrum H2(*m*) and the intensity spectrum Y2(*m*), thereby to generate the intensity spectrum Z2(*m*) of the whole band BF, and generates an audio signal Sz0 from a series of the intensity spectra Z2(*m*). The intensity spectrum Z2(*m*) is, for example, a spectrum with an intensity spectrum Y2(*m*) in the frequency band BL and an intensity spectrum H2(*m*) in the frequency band BH.

In the fifth embodiment, the same effects as those in the first embodiment are realized. In the fifth embodiment, the output data O(m) does not include the components of the frequency band BL. Therefore, compared with a configuration (e.g., the first embodiment) in which the output data O(m) includes the components of the whole band BF, the processing load of the learning processing Sb and the size of the estimation model MT are reduced. On the other hand, according to the first embodiment in which the output data O(m) includes the components throughout the whole band BF, it is possible to easily generate sound throughout the whole band BF compared with the fifth embodiment.

In the first embodiment, an example is given of the first output data O1(*m*) representative of the components of the whole band BF, including the frequency band BL and the frequency band BH, included in the first sound. In the fifth embodiment, an example is given of the first output data O1(*m*) representative of the components of the frequency band BH, included in the first sound. As will be understood from the above examples, the first output data O1(*m*) is comprehensively expressed as data representative of first estimated components of an output frequency band including the frequency band BH included in the first sound. In other words, the first output data O1(*m*) may or may not include the components of the frequency band BL. Similarly, the second output data O2(*m*) is comprehensively expressed as data representative of second estimated components of the output frequency band including the frequency band BH, included in the second sound. In other words, the second output data O2(*m*) may or may not include the components of the frequency band BL.

F: Modifications

The following are examples of specific modifications that can be added to each of the above examples. Two or more aspects freely selected from the following examples may be combined as appropriate to the extent that they do not contradict each other.

(1) In each of the above embodiments, an example is given of mix sound data Dx(m) including an intensity spectrum X(m) of a target period and intensity spectra X of other unit periods, but the content of the mix sound data Dx(m) is not limited thereto. For example, a configuration may be assumed in which the mix sound data Dx(m) of the target period includes only the intensity spectrum X(m) of the target period. The mix sound data Dx(m) of the target period may include an intensity spectrum X of a unit period either prior or subsequent to that target period. For example, the mix sound data Dx(m) may be configured to include only the prior intensity spectrum X (e.g., X(m−1)), or the mix sound data Dx(m) may be configured to include only the subsequent intensity spectrum X (e.g., X(m+1)). In each of the above embodiments, the mix sound data Dx(m) of the target period includes the intensity spectra X (X(m−4), X(m−2), X(m+2), X(m+4) for other unit periods spaced before and after the target period. However, the mix sound data Dx(m) may include an intensity spectrum X(m−1) of a unit period immediately before the target period or an intensity spectrum X(m+1) of a unit period immediately after the target period. Three or more consecutive intensity spectra X timewise (e.g., X(m−2), X(m−1), X(m), X(m+1), X(m+2)) may be included by the mix sound data Dx(m).

In the above description, the focus is on the mix sound data Dx(m), but the same applies to the first sound data D1(*m*) and the second sound data D2(*m*). For example, the first sound data D1(*m*) of the target period may include only the intensity spectrum Y1(*m*) of that target period, or may include the intensity spectrum Y1 of a unit period either prior or subsequent to the target period. The first sound data D1(*m*) of the target period may include an intensity spectrum Y1(*m*−1) of a unit period immediately before the target period, or an intensity spectrum Y1(*m*+1) of the unit period immediately after the target period. The same applies to the second sound data D2(*m*).

(2) In each of the above embodiments, the focus is on the frequency band BL that is below a predetermined frequency and the frequency band BH that is above the predetermined frequency. However, the relationship between the frequency band BL and the frequency band BH is not limited thereto. For example, a configuration may be assumed in which the frequency band BL is above the predetermined frequency and the frequency band BH is below the predetermined frequency. The frequency band BL and the frequency band BH are not limited to a continuous frequency band on the frequency axis. For example, the frequency band BF may be divided into sub frequency bands. One or more frequency bands selected from among the sub frequency bands may be considered to be the frequency band BL, and the remaining one or more frequency bands may be considered to be the frequency band BH. For example, among the sub frequency bands, a set of two or more odd-numbered frequency bands may be the frequency band BL, and a set of two or more even-numbered frequency bands may be the frequency band BH. Alternatively, among the sub frequency bands, a set of two or more even-numbered frequency bands may be the frequency band BL, and a set of two or more odd-numbered frequency bands may be the frequency band BH.

(3) In each of the above embodiments, an example is given of a case in which an audio signal Sx prepared in advance is processed. However, the audio processor 20 may perform the audio processing Sa on the audio signal Sx in real time in parallel with the recording of the audio signal Sx. It is of note that there will be a time delay of a length corresponding to the four unit periods in a configuration in which the mix sound data Dx(m) includes the intensity spectrum X(m+4), which is after the target period, as in the examples in the above embodiments.

(4) In each of the above embodiments, the band extender 23 generates both the first output data O1(*m*) representative of the intensity spectrum Z1(*m*) in which the first sound is emphasized and the second output data O2(*m*) representative of the intensity spectrum Z2(*m*) in which the second sound is emphasized. However, the band extender 23 may generate either the first output data O1(*m*) or the second output data O2(*m*) as the output data O(m). For example, a case can be assumed in which an audio processing system 100 is used for reducing a singing voice by applying the audio processing Sa to the mix of the singing voice (first sound) and an instrumental sound (second sound). In such a case, it suffices if the band extender 23 generates output data O(m) (second output data O2(*m*)) that represents the intensity spectrum Z2(*m*) in which the second sound is emphasized. Thus, the generation of the intensity spectrum Z1(*m*) in which the first sound is emphasized is omitted. As will be understood from the above description, the generator 232 is expressed as an element that generates at least one of the first output data O1(*m*) or the second output data O2(*m*).

(5) In each of the above embodiments, the audio signal Sz is generated in which one of the first and second sounds is emphasized. However, the processing performed by the audio processor 20 is not limited thereto. For example, the audio processor 20 may output as the audio signal Sz a weighted sum of a first audio signal generated from a series of the first output data O1(*m*) and a second audio signal generated from a series of the second output data O2(*m*). The first audio signal is a signal in which the first sound is emphasized, and the second audio signal is a signal in which the second sound is emphasized. Further, the audio processor 20 may perform audio processing, such as effects impartation, for each of the first audio signal and the second audio signal independently of each other, and add together the first audio signal and the second audio signal after the audio processing, thereby to generate the audio signal Sz.

(6) The audio processing system 100 may be realized by a server device communicating with a terminal device, such as a portable phone or a smartphone. For example, the audio processing system 100 generates an audio signal Sz by performing audio processing Sa on an audio signal Sx received from a terminal device, and transmits the audio signal Sz to the terminal device. In a configuration in which the audio processing system 100 receives an intensity spectrum X(m) generated by a frequency analyzer 21 mounted to a terminal device, the frequency analyzer 21 is omitted from the audio processing system 100. In a configuration in which the waveform synthesizer 24 (and the volume controller 25) are mounted to a terminal device, the output data O(m) generated by the band extender 23 is transmitted from the audio processing system 100 to the terminal device. Accordingly, the waveform synthesizer 24 and the volume adjuster 25 are omitted from the audio processing system 100.

The frequency analyzer 21 and the sound source separator 22 may be mounted to a terminal device. The audio processing system 100 may receive from the terminal device an intensity spectrum X(m) generated by the frequency analyzer 21, and an intensity spectrum Y1(*m*) and an intensity spectrum Y2(*m*) generated by the sound source separator 22. As will be understood from the above description, the frequency analyzer 21 and the sound source separator 22 may be omitted from the audio processing system 100. Even if the audio processing system 100 does not include the sound source separator 22, it is still possible to achieve the desired effect of reducing the processing load for sound source separation performed by external devices such as terminal devices.

(7) In each of the above embodiments, an example is given of the audio processing system 100 having the audio processor 20 and the learning processor 30. However, one of the audio processor 20 and the learning processor 30 may be omitted. A computer system with the learning processor 30 can also be described as an estimation model training system (machine learning system). The audio processor 20 may or may not be provided in the estimation model training system.

(8) The functions of the audio processing system 100 are realized, as described above, by cooperation of one or more processors constituting the controller 11 and the programs (P1, P2) stored in the storage device 12. The programs according to the present disclosure may be provided in a form stored in a computer-readable recording medium and installed on a computer. The recording medium is a non-transitory recording medium, for example, and an optical recording medium (optical disk), such as CD-ROM, is a good example. However, any known type of recording media such as semiconductor recording media or magnetic recording media are also included. Non-transitory recording media include any recording media except for transitory, propagating signals, and volatile recording media are not excluded. In a configuration in which a delivery device delivers a program via a communication network, a storage device 12 that stores the program in the delivery device corresponds to the above non-transitory recording medium.

G: Appendix

For example, the following configurations are derivable from the above embodiments and modification.

An audio processing method according to one aspect (Aspect 1) of the present disclosure includes obtaining input data including first sound data, second sound data, and mix sound data, the first sound data included in the input data representing first components of a first frequency band, included in a first sound corresponding to a first sound source, the second sound data included in the input data representing second components of the first frequency band, included in a second sound corresponding to a second sound source that differs from the first sound source, and the mix sound data included in the input data representing mix components of an input frequency band including a second frequency band that differs from the first frequency band, the mix components being included in a mix sound of the first sound and the second sound; and generating, by inputting the obtained input data to a trained estimation model, at least one of: first output data representing first estimated components of an output frequency band including the second frequency band, included in the first sound, or second output data representing second estimated components of the output frequency band, included in the second sound.

According to the above configuration, at least one of (a1) the first output data representative of the first estimated components of the output frequency band including the second frequency band included in the first sound or (a2) the second output data representative of the second estimated components of the output frequency band including the second frequency band included in the second sound are generated from input data including (b1) the first sound data representative of the first components of the first frequency band, included in the first sound, and (b2) the second sound data representative of the second components of the first frequency band, included in the second sound. Thus, it suffices if sound represented by the first sound data comprises the first components of the first frequency band, included in the first sound, and if sound represented by the second sound data comprises the second components of the first frequency band, included in the second sound. According to the above configuration, it is only necessary to perform sound source separation on the first frequency band when sound separation is to be performed for a mix sound consisting of a first sound corresponding to a first sound source and a second sound corresponding to a second sound source to isolate the first and the second sounds. Therefore, the processing load for sound source separation is reduced.

The "first sound corresponding to the first sound source" means a sound that predominantly includes sound produced by the first sound source. In other words, the concept of "the first sound corresponding to the first sound source" covers not only the sound produced by the first sound source alone, but also a sound that includes, for example, the first sound produced by the first sound source plus a small amount of the second sound from the second sound source (namely, the second sound is not completely removed by the sound source separation). Similarly, "the second sound corresponding to the second sound source" means a sound that predominantly includes the sound produced by the second sound source. In other words, the concept of "the second sound corresponding to the second sound source" covers not only the sound produced by the second sound source alone, but also, a sound that includes, for example, the second sound produced by the second sound source plus a small amount of the first sound from the first sound source (namely, the first sound is not completely removed by the sound source separation).

The mix components represented by the mix sound data may comprise (i) mix components of both the first and second frequency bands (e.g., mix components throughout the whole band) included in the mix sound or (ii) mix components of the second frequency band (but not the mix components of the first frequency band) included in the mix sound.

The first frequency band and the second frequency band are two different frequency bands on the frequency axis. Typically, the first frequency band and the second frequency band do not overlap. However, the first frequency band and the second frequency band may partially overlap. The relationship between the position on the frequency axis of the first frequency band and the position on the frequency axis of the second frequency band may be freely selected. The bandwidth of the first frequency band and the bandwidth of the second frequency band may or may not be the same.

The first estimated components represented by the first output data may comprise components of the second frequency band only, included in the first sound, or the components of a frequency band including the first and second frequency bands, included in the first sound. Similarly, the second estimated components represented by the second output data may comprise the components of the second frequency band only, included in the second sound, or the components of a frequency band including the first and second frequency bands, included in the second sound.

The trained estimation model is a statistical model that has learned a relationship between input data and output data (first output data and second output data). The estimation model is typically a neural network, but the estimation model type is not limited thereto.

In an example (Aspect 2) of Aspect 1, the mix sound data included in the input data represents the mix components of the input frequency band that does not include the first frequency band, included in the mix sound of the first sound and the second sound. According to the above configuration, since the mix sound data does not include the mix components of the first frequency band, it is possible to reduce both the processing load required for machine learning of the estimation model and the size of the estimation model compared with a configuration in which the sound represented by the mix sound data includes the mix components of the first frequency band and the mix components of the second frequency band.

In an example (Aspect 3) of Aspect 1 or Aspect 2, the first sound data represents intensity spectra of the first components included in the first sound, the second sound data represents intensity spectra of the second components included in the second sound, the mix sound data represents intensity spectra of the mix components included in the mix sound of the first sound and the second sound. Preferably the input data may include: a normalized vector that includes the first sound data, the second sound data, and the mix sound data, and an intensity index representing a magnitude of the vector. According to the above configuration, since the intensity index is included in the input data, the first output data and the second output data representing the components of the loudness corresponding to the mix sound are generated. Therefore, advantageously, the process of adjusting (scaling) the intensity of the sound represented by the first output data and second output data is not necessary.

In an example (Aspect 4) of any one of Aspect 1 to Aspect 3, the estimation model is trained so that a mix of (i) components of the second frequency band included in the first estimated components represented by the first output data and (ii) components of the second frequency band included in the second estimated components represented by the second output data approximates components of the second frequency band included in the mix sound of the first sound and the second sound. According to the above configuration, the estimation model is trained so that a mix of the components of the second frequency band included in the first estimated components represented by the first output data and the components of the second frequency band included in the second estimated components represented by the second output data approximates the components of the second frequency band included in the mix sound. Therefore, compared with a configuration that uses an estimation model trained without taking the above condition into account, it is possible to estimate with higher accuracy the components of the second frequency band in the first sound (first output data) and the components of the second frequency band in the second sound (second output data).

In an example (Aspect 5) of any one of Aspect 1 to Aspect 4, the method further enables the first components and the second components to be generated by performing sound source separation of the mix sound of the first sound and the second sound, regarding the first frequency band. According to the above configuration, the processing load for sound source separation is reduced compared with a configuration in which sound source separation is performed for the whole band of the mix sound, because sound source separation is performed for the components of the first frequency band included in the mix sound.

In an example (Aspect 6) of any one of Aspect 1 to Aspect 5, the first output data represents the first estimated components including (a1) the first components of the first frequency band and (a2) components of the second frequency band, included in the first sound, and the second output data represents the second estimated components including (b1) the second components of the first frequency band and (b2) components of the second frequency band, included in the second sound. According to the above configuration, the first output data and the second output data are generated including components of both the first frequency band and the second frequency band. Therefore, compared with a configuration in which the first output data represents only the second frequency band components of the first sound and the second output data represents only the second frequency band components of the second sound, sound over both the first and second frequency bands can be generated in a simplified manner.

In a method of training an estimation model according to one aspect (Aspect 7) of the present disclosure, a tentative estimation model is prepared, and a plurality of training data, each training data including training input data and corresponding training output data is obtained. A trained estimation model is established that has learned a relationship between the training input data and the training output data by machine learning in which the tentative estimation model is trained using the plurality of training data. The training input data includes first sound data, second sound data, and mix sound data, the first sound data representing first components of a first frequency band, included in a first sound corresponding to a first sound source, the second sound data representing second components of the first frequency band, included in a second sound corresponding to a second sound source that differs from the first sound source, and the mix sound data representing mix components of an input frequency band including a second frequency band that differs from the first frequency band, the mix components being included in a mix sound of the first sound and the second sound. The training output data includes at least one of: first output data representing first output components of an output frequency band including the second frequency band, included in the first sound, or second output data representing second output components of the output frequency band, included in the second sound.

According to the above configuration, a trained estimation model is established that generates at least one of the first output data representing the first estimated components of an output frequency band including the second frequency band, included in the first sound, or the second output data representing the second estimated components of the output frequency band, included in the second sound, from the first sound data representing the first components of the first frequency band, included in the first sound, and the second sound data representing the second components of the first frequency band, included in the second sound. According to the above configuration, in a case in which sound separation is to be performed of a mix sound consisting of a first sound corresponding to a first sound source and a second sound corresponding to a second sound source to isolate the first and the second sounds, it is only necessary to perform sound source separation of the mix sound, regarding the first frequency band. Therefore, the processing load for sound source separation is reduced.

The present disclosure is also realized as an audio processing system that implements the audio processing method according to each of the above examples (Aspect 1 to Aspect 6), or a program that causes a computer to execute the audio processing method. The present disclosure is also realized as an estimation model training system that realizes the training method according to Aspect 7, or a program that causes a computer to execute the training method.

DESCRIPTION OF REFERENCE SIGNS

100 . . . audio processing system, 11 . . . controller, 12 . . . storage device, 13 . . . sound outputter, 20 . . . audio processor, 21 . . . frequency analyzer, 22 . . . sound source separator, 23 . . . band extender, 231 . . . obtainer, 232 . . . generator, 24 . . . waveform synthesizer, 25 . . . volume adjuster, 30 . . . learning processor, 31 . . . obtainer, 32 . . . trainer, M . . . estimation model.

What is claimed:

1. A computer-implemented audio processing method, comprising:

generating first components of only a first frequency band included in a first sound corresponding to a first sound source, and second components of only the first frequency band included in a second sound corresponding to a second sound source that differs from the first sound source, by performing sound source separation of a mix sound of the first sound and the second sound regarding the first frequency band, wherein the mix sound includes a second frequency band that differs from the first frequency band;

obtaining input data including first sound data, second sound data, and mix sound data, wherein:

the first sound data included in the input data represents the first components, the second sound data included in the input data represents the second components, and the mix sound data included in the input data represents mix components of an input frequency band including the second frequency band that differs from the first frequency band, the mix components being included in the mix sound of the first sound and the second sound; and generating, by inputting the obtained input data to a trained estimation model, first output data representing first estimated components of an output frequency band including the second frequency band, included in the first sound, and second output data representing second estimated components of the output frequency band included in the second sound.

2. The audio processing method according to claim 1, wherein the mix sound data included in the input data represents the mix components of the input frequency band that does not include the first frequency band, included in the mix sound of the first sound and the second sound.

3. The audio processing method according to claim 1, wherein:

the first sound data represents intensity spectra of the first components included in the first sound, the second sound data represents intensity spectra of the second components included in the second sound, and the mix sound data represents intensity spectra of the mix components included in the mix sound of the first sound and the second sound.

4. The audio processing method according to claim 1, wherein:

the input data includes:

a normalized vector that includes the first sound data, the second sound data, and the mix sound data, and an intensity index representing a magnitude of the vector.

5. The audio processing method according to claim 1, wherein the estimation model is trained so that a mix of (i) components of the second frequency band included in the first estimated components represented by the first output data and (ii) components of the second frequency band included in the second estimated components represented by the second output data approximates components of the second frequency band included in the mix sound of the first sound and the second sound.

6. The audio processing method according to claim 1, wherein:

the first output data represents the first estimated components including:

the first components of the first frequency band, and components of the second frequency band, included in the first sound, and the second output data represents the second estimated components including:

the second components of the first frequency band, and components of the second frequency band, included in the second sound.

7. A computer-implemented training method of an estimation model, comprising:

preparing a tentative estimation model;

obtaining a plurality of training data, each training data including training input data and corresponding training output data; and establishing a trained estimation model that has learned a relationship between the training input data and the training output data by machine learning in which the tentative estimation model is trained using the plurality of training data, wherein:

the training input data includes first sound data, second sound data, and mix sound data, the first sound data representing first components of only a first frequency band, included in a first sound corresponding to a first sound source, the second sound data representing second components of only the first frequency band, included in a second sound corresponding to a second sound source that differs from the first sound source, and the mix sound data representing mix components of an input frequency band including a second frequency band that differs from the first frequency band, the mix components being included in a mix sound of the first sound and the second sound, and the training output data includes first output data representing first output components of an output frequency band including the second frequency band, included in the first sound, and second output data representing second output components of the output frequency band, included in the second sound.

8. An audio processing system comprising:

one or more memories for storing instructions; and one or more processors communicatively connected to the one or more memories and that execute the instructions to:

generate first components of only a first frequency band included in a first sound corresponding to a first sound source, and second components of only the first frequency band included in a second sound corresponding to a second sound source that differs from the first sound source, by performing sound source separation of a mix sound of the first sound and the second sound regarding the first frequency band, wherein the mix sound includes a second frequency band that differs from the first frequency band;

obtain input data including first sound data, second sound data, and mix sound data, wherein:

the first sound data included in the input data represents the first components, the second sound data included in the input data represents the second components, and the mix sound data included in the input data represents mix components of an input frequency band including the second frequency band that differs from the first frequency band, the mix components being included in the mix sound of the first sound and the second sound; and generate, by inputting the obtained input data to a trained estimation model, first output data representing first estimated components of an output frequency band including the second frequency band, included in the first sound, and second output data representing second estimated components of the output frequency band, included in the second sound.

* * * * *